US010937017B2

(12) United States Patent
Li

(10) Patent No.: US 10,937,017 B2
(45) Date of Patent: Mar. 2, 2021

(54) MOBILE PAYMENT SYSTEMS AND METHODS FOR IN-STORE AND ONLINE PURCHASES

(71) Applicant: Chian Chiu Li, Fremont, CA (US)

(72) Inventor: Chian Chiu Li, Fremont, CA (US)

(*) Notice: Subject to any disclaimer, the term of this patent is extended or adjusted under 35 U.S.C. 154(b) by 16 days.

(21) Appl. No.: 16/389,903

(22) Filed: Apr. 19, 2019

(65) Prior Publication Data

US 2019/0244190 A1    Aug. 8, 2019

Related U.S. Application Data

(63) Continuation-in-part of application No. 15/009,838, filed on Jan. 29, 2016, now Pat. No. 10,332,098.

(51) Int. Cl.
| G06Q 20/30 | (2012.01) |
| G06Q 20/32 | (2012.01) |
| G06Q 30/06 | (2012.01) |
| H04L 29/12 | (2006.01) |
| G06Q 20/40 | (2012.01) |
| G06Q 20/38 | (2012.01) |

(52) U.S. Cl.
CPC ....... *G06Q 20/3223* (2013.01); *G06Q 20/322* (2013.01); *G06Q 20/3278* (2013.01); *G06Q 20/38215* (2013.01); *G06Q 20/4012* (2013.01); *G06Q 30/0641* (2013.01); *H04L 61/30* (2013.01)

(58) Field of Classification Search
CPC combination set(s) only.
See application file for complete search history.

(56) References Cited

U.S. PATENT DOCUMENTS

| 10,055,715 | B1* | 8/2018 | Grassadonia | G06Q 20/4012 |
| 2001/0034725 | A1* | 10/2001 | Park | G06Q 20/385 |
| | | | | 705/79 |
| 2002/0099832 | A1* | 7/2002 | Yaegerman | H04L 63/0421 |
| | | | | 709/228 |
| 2003/0061167 | A1* | 3/2003 | Mann, III | G06Q 20/04 |
| | | | | 705/64 |
| 2008/0077527 | A1 | 3/2008 | Choe et al. | |
| 2008/0140520 | A1* | 6/2008 | Hyder | G06O 30/0207 |
| | | | | 705/14.1 |
| 2013/0018785 | A1* | 1/2013 | Dolphin | G06Q 20/3223 |
| | | | | 705/40 |
| 2016/0012465 | A1* | 1/2016 | Sharp | G06Q 20/384 |
| | | | | 705/14.17 |

(Continued)

OTHER PUBLICATIONS

A Method Providing Identity Privacy to Mobile Users during Authentication Didier Samfat, Refik Molva (Year: 1995).*

(Continued)

*Primary Examiner* — William E Rankins

(57) ABSTRACT

Systems and methods for implementing mobile payments. In an aspect of in-store purchase, a merchant sends a payment amount and merchant account info to transaction center. A buyer sends a code and buyer account info to transaction center. The code represents the merchant. In an aspect of online purchase, an e-commerce merchant provides options for a buyer to use names other than a first name plus a surname. In one embodiment, a buyer submits a shortened name or nickname for online purchases when a given payment service is used as a payment method.

20 Claims, 11 Drawing Sheets

(56) References Cited

U.S. PATENT DOCUMENTS

| | | | |
|---|---|---|---|
| 2016/0057619 A1* | 2/2016 | Lopez | G06Q 20/385 |
| | | | 380/247 |
| 2018/0053182 A1* | 2/2018 | Mokhasi | G06Q 20/385 |
| 2018/0240133 A1* | 8/2018 | Lu | G06O 30/0185 |
| 2018/0315015 A1 | 11/2018 | Pientka et al. | |
| 2019/0147063 A1* | 5/2019 | Kang | G06F 16/435 |
| | | | 707/737 |
| 2020/0034160 A1* | 1/2020 | Koren | H04L 67/10 |
| 2020/0051002 A1* | 2/2020 | Kim | G06Q 10/083 |

OTHER PUBLICATIONS

Bank of America Corporation; Researchers Submit Patent Application, "Online Payment System and Method", for Approval Information Technology Newsweekly: 860. Atlanta: NewsRx. (Aug 26, 2014) (Year: 2014).*

* cited by examiner

User Info

Sharing with Transaction Center?

| | First Name | Surname | Yes | No |
|---|---|---|---|---|
| Name (Optional) — 24 | ☐ | ☐ — 24 | x | |
| Shortened Name (Optional) — 26 | ☐ | | x | |
| Phone Number — 28 | ☐ | | ☐ 34 | ☐ 36 |
| Email Address — 30 | ☐ | | ☐ 38 | ☐ 40 |
| Shipping Address — 32 | ☐ | | ☐ 42 | ☐ 44 |

60

Account Info at Transaction Center for Mobile Payment

Phone No. (Optional) ☐ — 46

Email Address (Optional) ☐ — 48

Address (Optional) ☐ — 50

⬤ 52
Click Here to Start Verification

Get Code to Verify Mobile Payment

Short Code ☐ — 54

Long Code ☐ — 56

⬤ 58
Click Here to Get Code

▬ 94
Click Here to Skip Code

FIG. 9

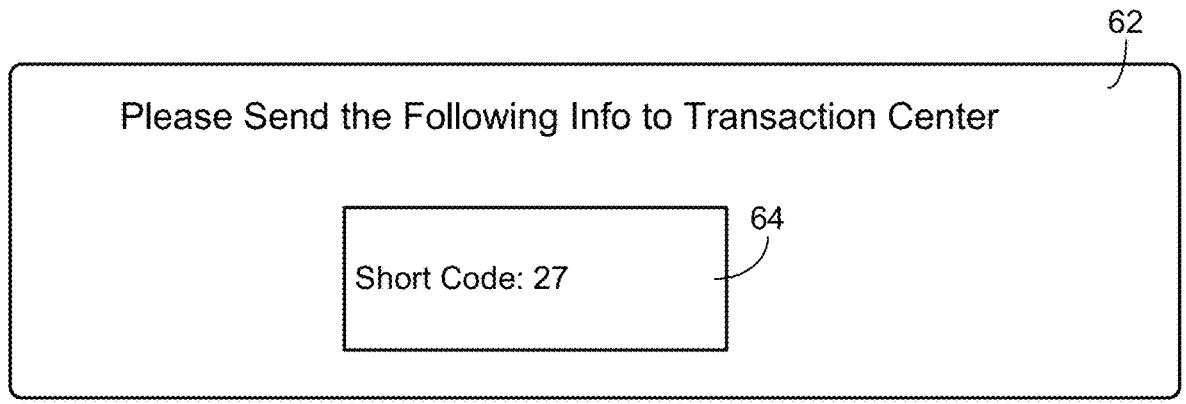
FIG. 11-A
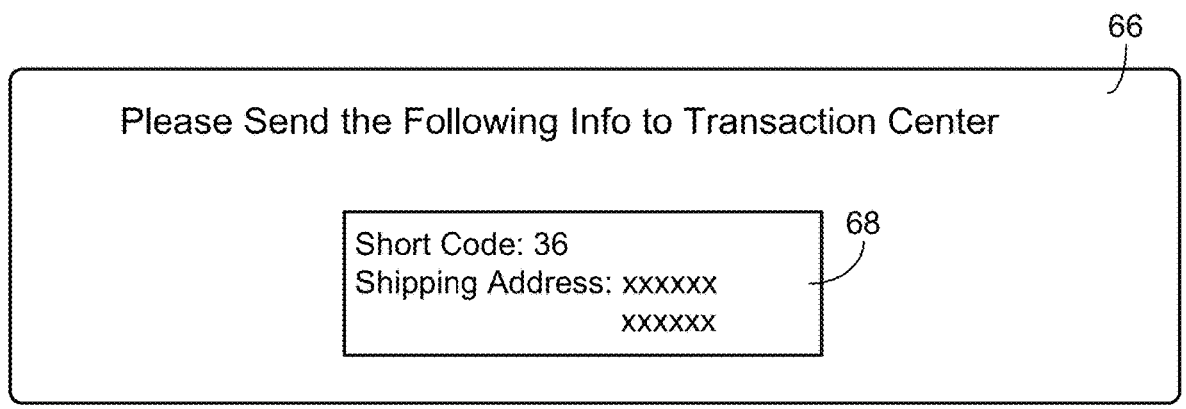
FIG. 11-B
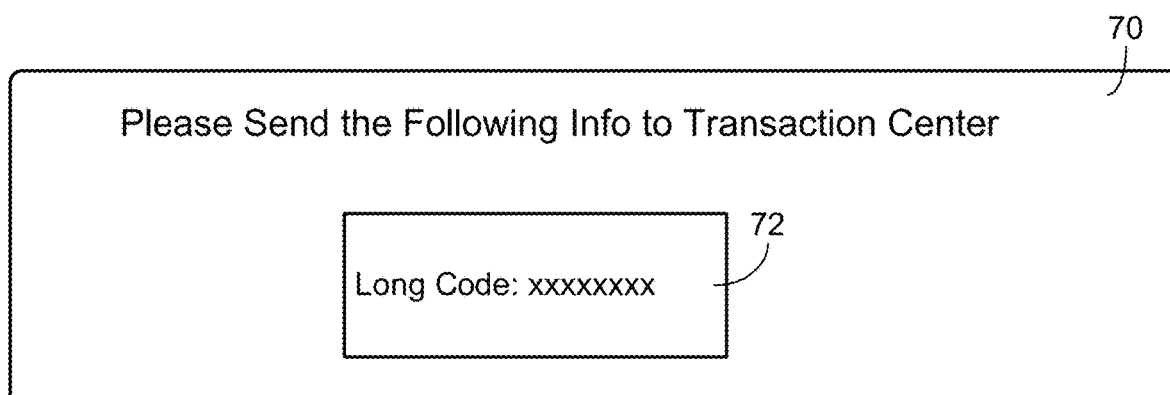
FIG. 11-C

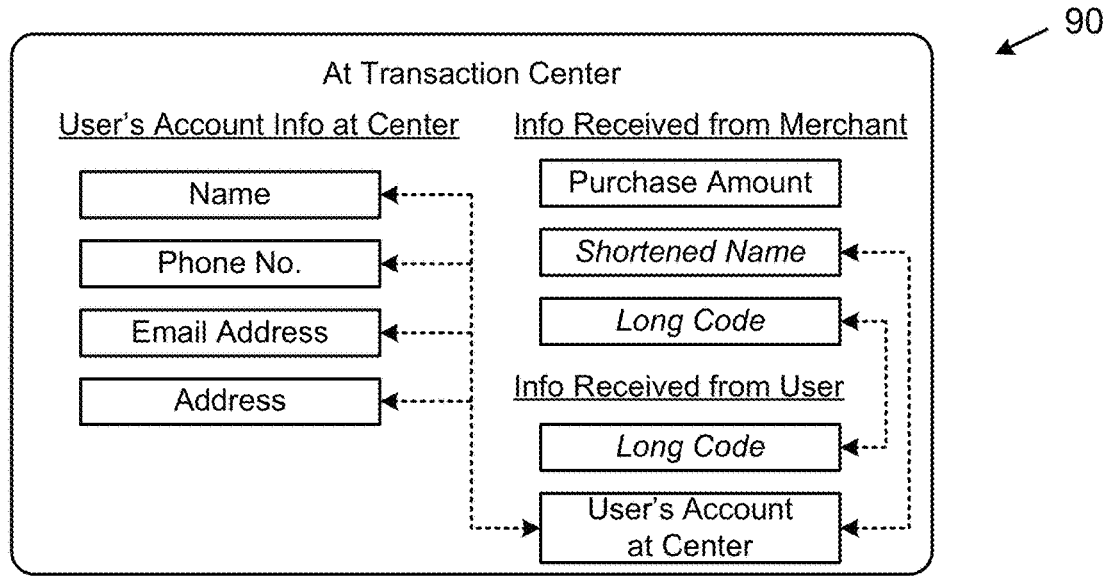
FIG. 17
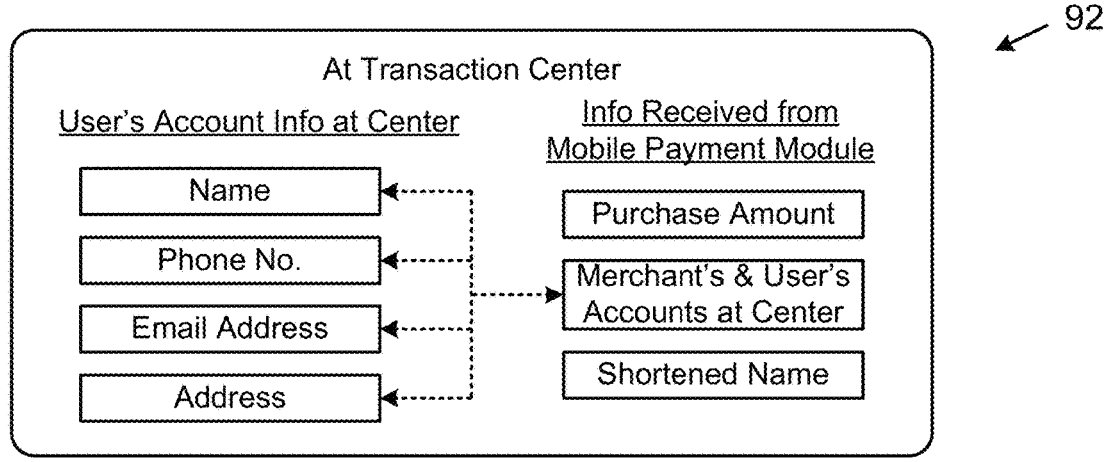
FIG. 18
FIG. 19
FIG. 20

MOBILE PAYMENT SYSTEMS AND METHODS FOR IN-STORE AND ONLINE PURCHASES

CROSS REFERENCE TO RELATED APPLICATION

This is a continuation-in-part of U.S. patent application Ser. No. 15/009,838, filed Jan. 29, 2016.

FEDERALLY SPONSORED RESEARCH

Not applicable

SEQUENCE LISTING OR PROGRAM

Not applicable

BACKGROUND—FIELD OF INVENTION

This invention relates to mobile payment, more particularly to implementing mobile payment process for in-store and online purchases.

BACKGROUND—DESCRIPTION OF PRIOR ART

Mobile payments by smartphones and potentially other mobile devices such as smart watch represent a growing trend, although payments with credit card, debit card, check, and cash are still dominant in stores these days. In fact, some in-store merchants may be reluctant to create a mobile payment system because of cost concerns. For instance, both near-field communication (NFC) and quick response (QR) code are popular mobile payment methods. But both would require new hardware and software upgrade for point of sale (POS) systems. The expense may be viewed as extra and unnecessary by retail business, especially small retailers. Demand for mobile payment is another factor that influences a merchant's decision, which, however, is still relatively low right now. If the demand could justify investment, merchants may want to accommodate it. The demand, on the other hand, is related to the availability of mobile payment at stores. If more merchants accept mobile payment, users may be more likely to develop a habit to use it. Thus, whether merchants are willing to add new technology at stores is the key in the emerging proliferation of mobile payment.

Therefore, there exists a need for a mobile payment method which is affordable for in-store merchants and relies upon current POS systems at stores.

Nowadays more and more users go to e-commerce websites to purchase goods from internet retailers or online merchants. They may use a credit card or mobile payment service as payment means. Before placing an order at a merchant's website, a user usually sets up an account and provides personal information such as a username, a real name or legal name, a phone number, an email address, and a billing address. Sometimes, a user also provides and stores credit card or mobile payment info at an internet shopping website for the convenience of online purchases. Although information submitted by users is usually kept in a merchant's system in a secured manner, there are concerns of data breaches and data leaks. It is desirable to provide less information to online merchants to reduce the risks.

Therefore, there exists a need which requires less personal information from a user for online purchases.

OBJECTS AND ADVANTAGES

Accordingly, several main objects and advantages of the present invention are:

a). to provide improved methods and systems for mobile payments;
b). to provide such methods and systems which are affordable for in-store merchants;
c). to provide such methods and systems which rely on a merchant's current system in a store;
d). to provide such methods and systems which use a code to represent a merchant of a store;
e). to provide such methods and systems which provide multiple options for a user to do mobile payment in a store;
f). to provide such methods and systems which provide multiple options for a merchant to implement in-store mobile payments;
g). to provide such methods and systems which utilize a mobile payment service to authenticate a user for online merchants;
h). to provide such methods and systems which provide options for a user to use a first name and a surname (last name), a shortened name, or a nickname for online purchases; and
i). to provide such methods and systems which enable an online merchant to implement online purchase transactions with a user's shortened name or nickname instead of a first name and a surname.

Further objects and advantages will become apparent from a consideration of the drawings and ensuing description.

SUMMARY

In accordance with the present invention, methods and systems are proposed for mobile payment process. First, an in-store merchant calculates a payment amount and sends it to transaction center. In the meantime, a user gets a code which represents the merchant and transmits it to transaction center. The center uses the code to relate the user to the merchant and then to the payment amount. After the merchant and user info is authenticated, the center transfers fund from a user account to a merchant account or gets authorization of payment from a financial institution. A user device may acquire a code through multiple methods including NFC, QR code, location based, and manual input. A merchant may get connected to transaction center via a POS system, a card reader, or a mobile device.

When a user purchases products on the Internet, the user may submit to an online merchant a shortened name or a nickname instead of a first name and a surname. An online merchant may rely on a mobile payment service to authenticate a user and thus doesn't need to do it. When a user uses a shortened name or a nickname, less personal info is given to online merchants. Hence, privacy protection and the e-commerce environment may be improved.

DRAWING FIGURES

Figure 5:
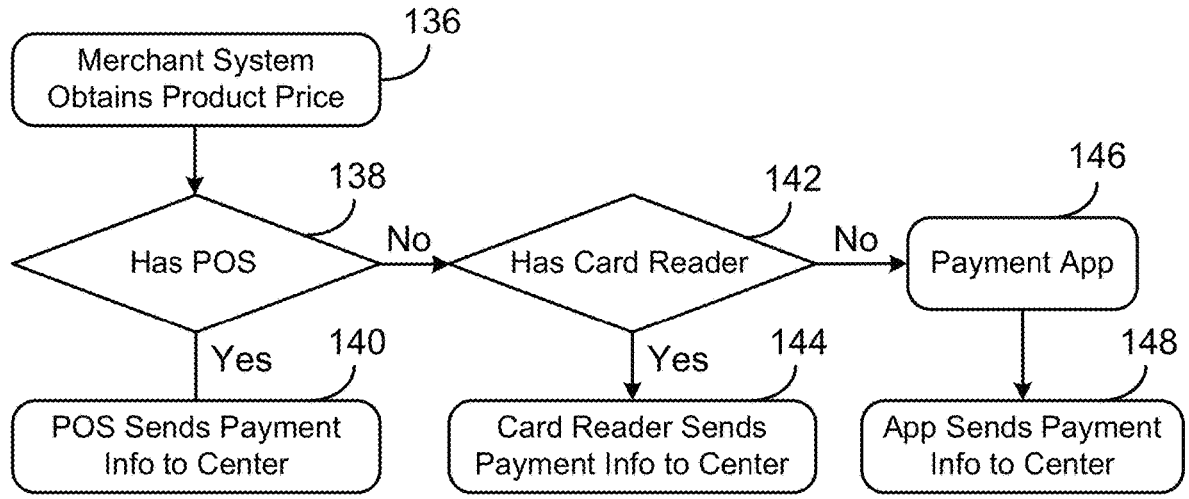
Figure 6:
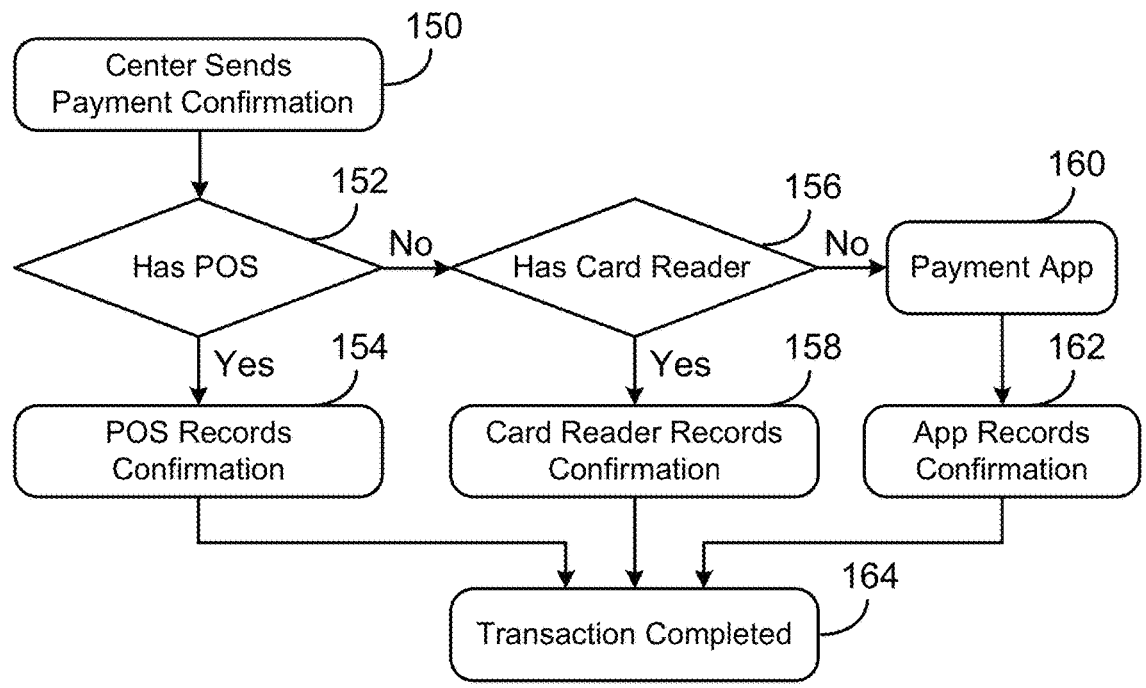

FIGS. 5 and 6 use exemplary flow diagrams to show embodiments of in-store payment process in accordance with the present invention.

Figure 7:
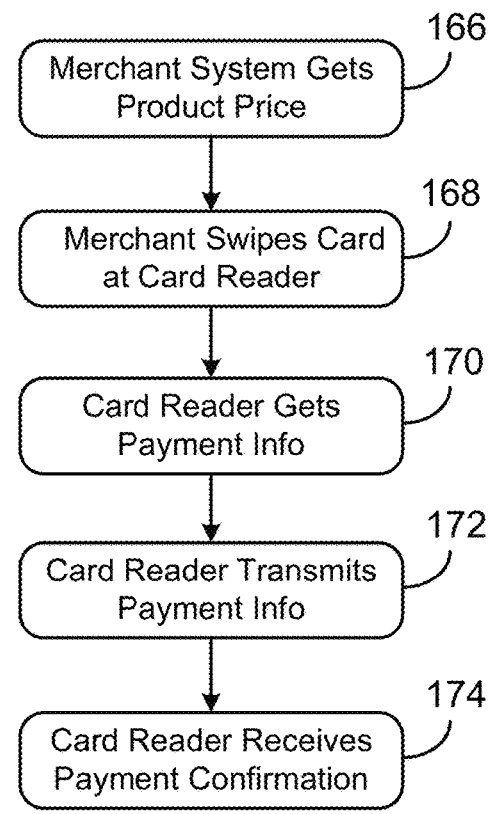

FIG. 7 is an exemplary flow diagram illustrating embodiments of using a card reader in mobile payment in accordance with the present invention.

Figure 8:
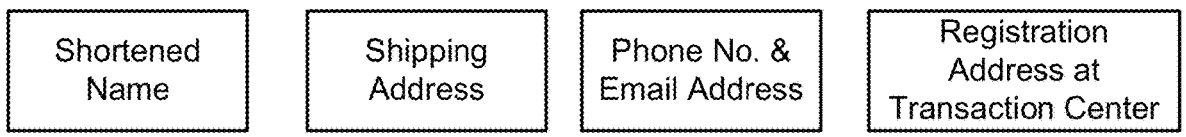

FIG. 8 is a graphic illustration showing an embodiment of online purchase in accordance with the present invention.

FIG. 9 is an exemplary diagram which illustrates an embodiment of online purchase process in accordance with the present invention.

Figure 10:
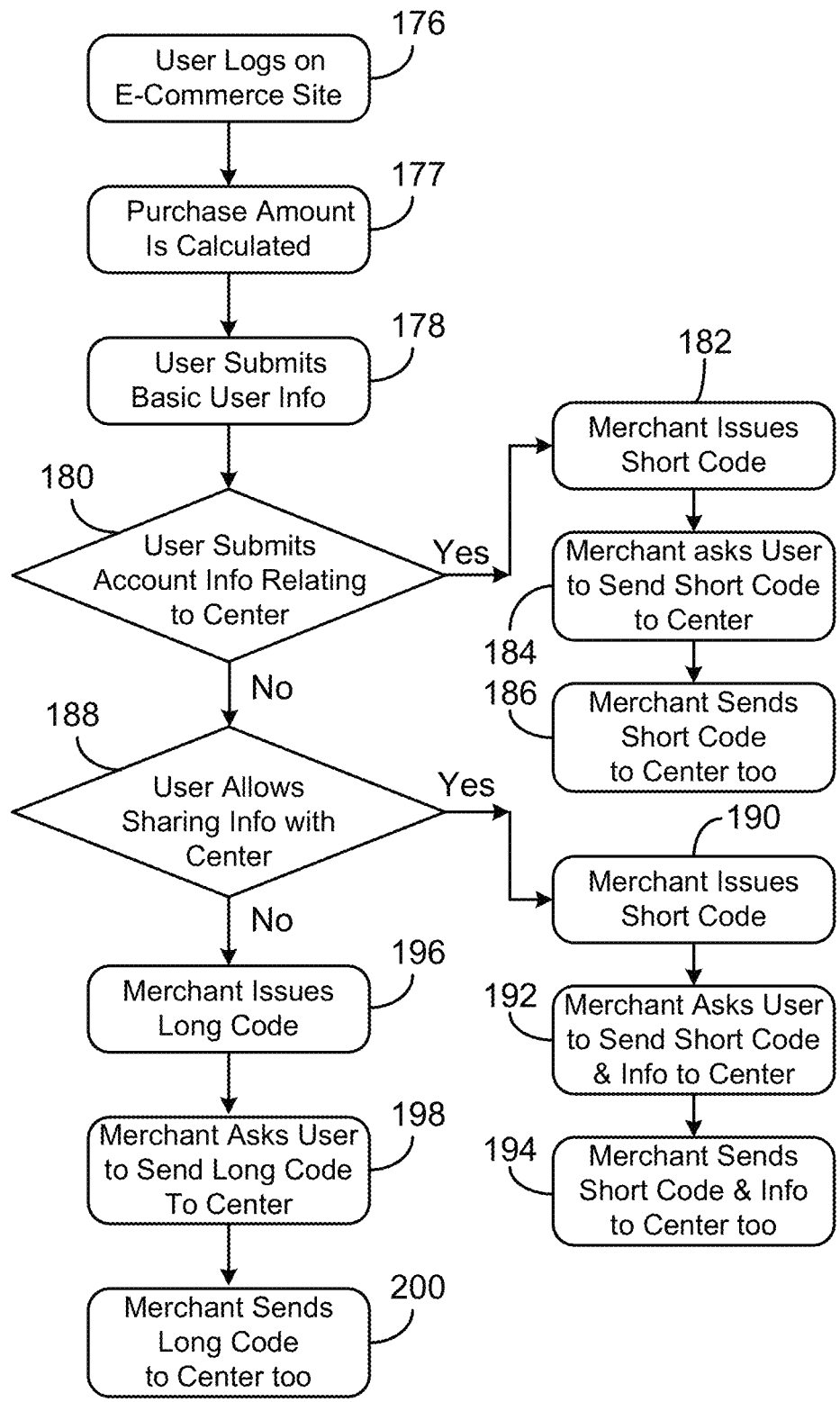

FIG. 10 is an exemplary flow diagram illustrating embodiments of online purchase process in accordance with the present invention.

FIGS. 11-A, 11-B, and 11-C are exemplary diagrams which illustrate embodiments of online purchase process in accordance with the present invention.

Figure 12:
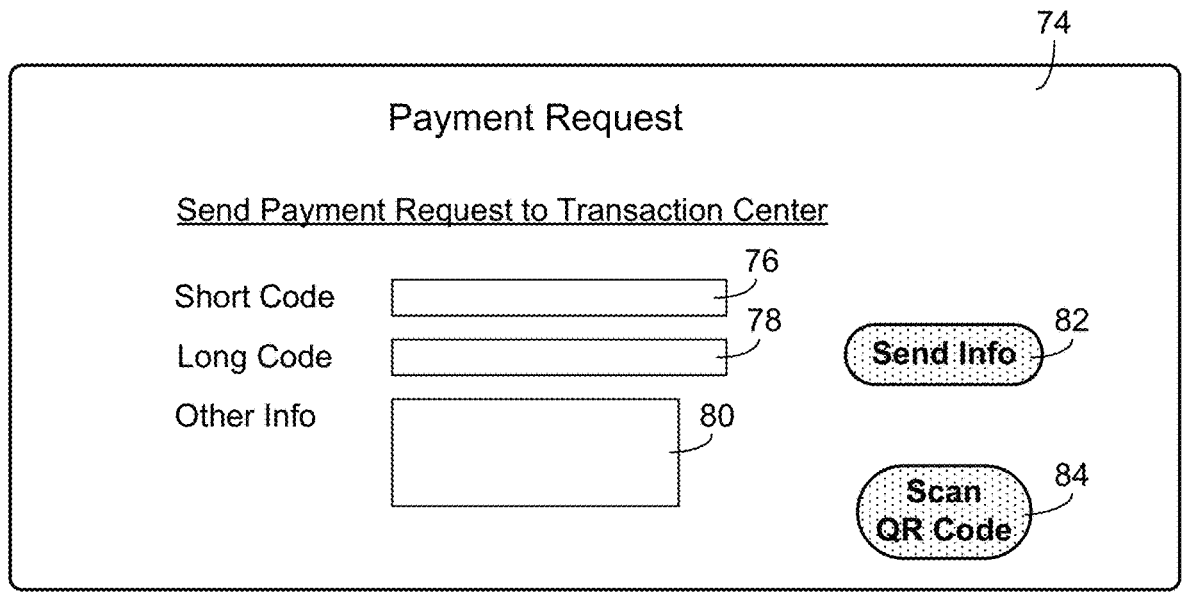

FIG. 12 is an exemplary diagram which illustrates an embodiment of online payment process in accordance with the present invention.

Figure 13:
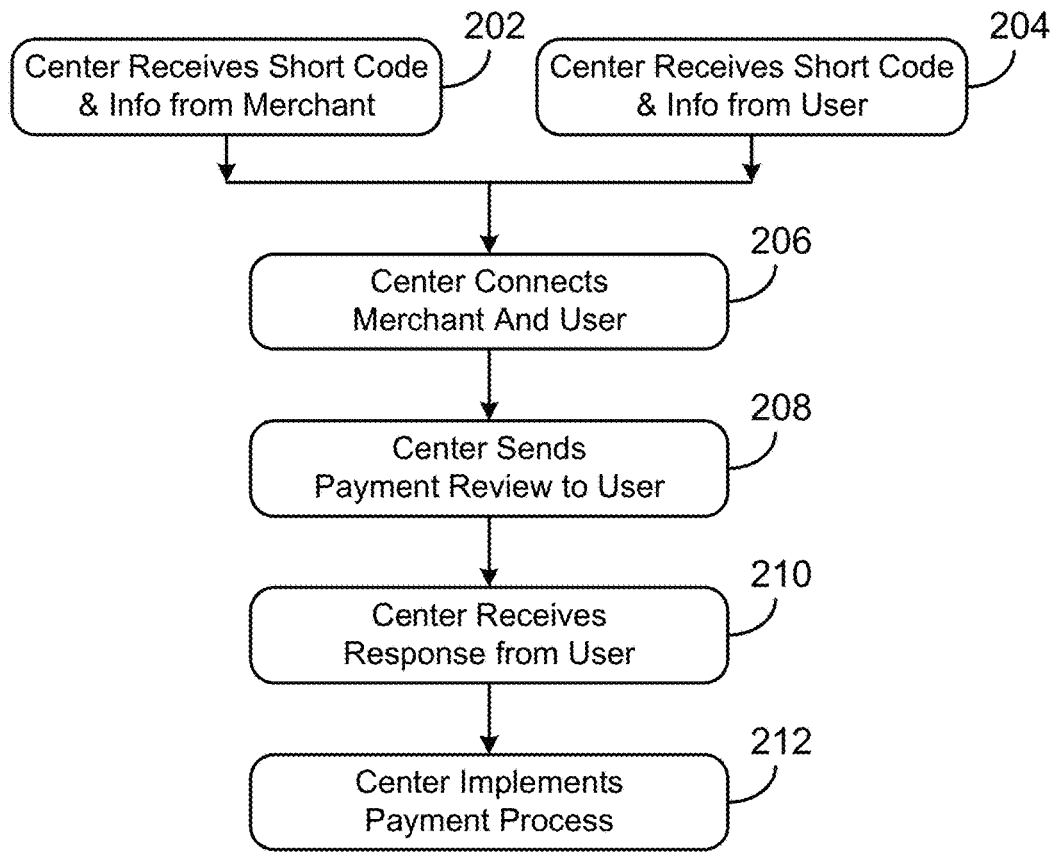
Figure 14:
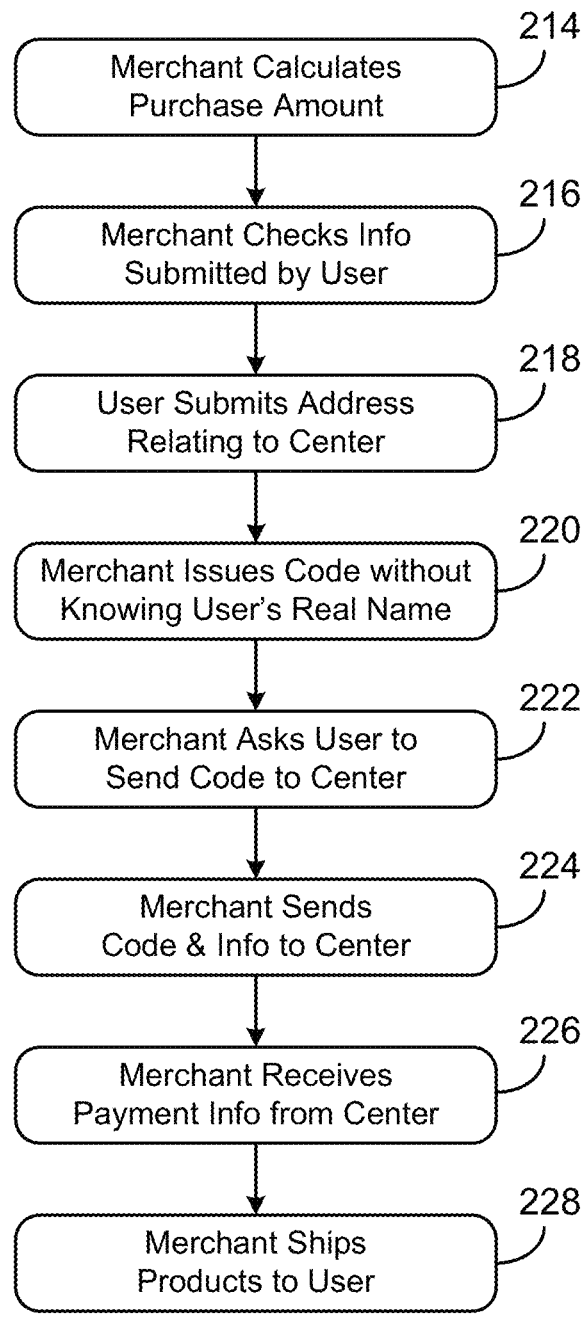

FIGS. 13 and 14 are exemplary flow diagrams illustrating embodiments of online payment process and online purchase process respectively in accordance with the present invention.

FIGS. 15, 16, 17, and 18 are exemplary diagrams which illustrate several embodiments of online payment process respectively in accordance with the present invention.

FIGS. 19 and 20 are exemplary diagrams which illustrate online purchase embodiments respectively in accordance with the present invention.

REFERENCE NUMERALS IN DRAWINGS

| 10 | Camera | 12 | Device |
|---|---|---|---|
| 14 | Processor | 16 | Computer Readable Medium |
| 18 | GPS Sensor | 20 | NFC Sensor |
| 22 | Accelerometer Sensor | 24 | Window |
| 26 | Window | 28 | Window |
| 30 | Window | 32 | Window |
| 34 | Checkbox | 36 | Checkbox |
| 38 | Checkbox | 40 | Checkbox |
| 42 | Checkbox | 44 | Checkbox |
| 46 | Window | 48 | Window |
| 50 | Window | 52 | Button |
| 54 | Window | 56 | Window |
| 58 | Button | 60 | Interface |
| 62 | Interface | 64 | Window |
| 66 | Interface | 68 | Window |
| 70 | Interface | 72 | Window |
| 74 | Interface | 76 | Window |
| 78 | Window | 80 | Window |
| 82 | Button | 84 | Button |
| 86 | Diagram | 88 | Diagram |
| 90 | Diagram | 91 | Window |
| 92 | Diagram | 93 | Window |
| 94 | Button | 95 | Window |
| 96 | Interface | 97 | Window |
| 98 | Interface | 99 | Window |

100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 177, 178, 180, 182, 184, 186, 188, 190, 192, 194, 196, 198, 200, 202, 204, 206, 208, 210, 212, 214, 216, 218, 220, 222, 224, 226, and 228 are exemplary steps.

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

Figure 1:
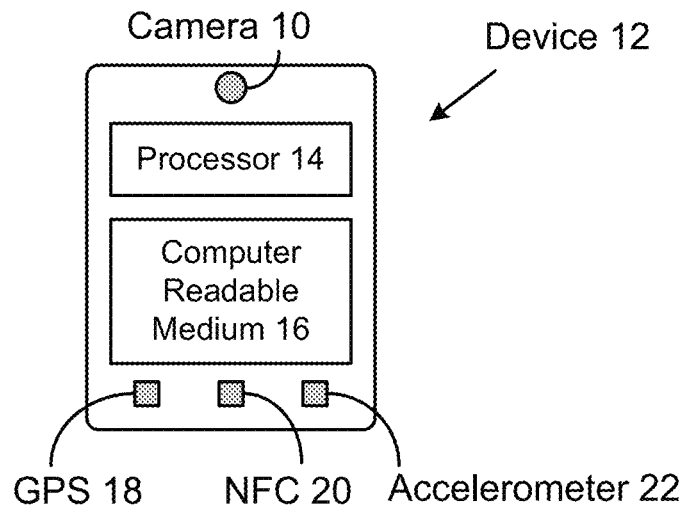
FIG. 1 is an exemplary block diagram describing a user device embodiment in accordance with the present invention.

FIG. 1 is an illustrative block diagram of one embodiment according to the present invention. A device 12 may represent a wireless electronic device, including but not limited to mobile phone, smart phone, smart watch, wearable device, personal computer, tablet computer, and the like. Device 12 may include a processor 14 and computer readable medium 16. Processor 14 may mean one or more processor chips or systems. Medium 16 may include a memory hierarchy built by one or more memory chips or storage modules like RAM, ROM, FLASH, magnetic, optical and/or thermal storage devices. Processor 14 may run programs or sets of executable instructions stored in medium 16 for performing various functions and tasks, e.g., surfing on the Internet, placing phone call, logging on a website, playing video or music, gaming, electronic payment, mobile payment, social networking, placing purchase order, sending and receiving email, short message, file, and data, executing other applications, etc. Device 12 may also include input, output, and communication components, which may be individual modules or integrated with processor 14. Communication components may connect the device to a server or another device via communication networks. Usually, Device 12 may have a display (not shown in FIG. 1 for brevity reason) and a graphical user interface (GUI). A display may have liquid crystal display (LCD) screen, organic light emitting diode (OLED) screen (including active matrix OLED (AMOLED) screen), LED screen, etc. A screen surface may be sensitive to touches, i.e., sensitive to haptic and/or tactile contact with a user, especially in the case of smart phone, tablet computer, smart watch, smart band, and other wearable devices. A touch screen may be used as a convenient tool for a user to enter input and interact with a system. Furthermore, device 12 may also have a voice recognition system for receiving verbal commands or audio input from a user.

A communication network which device 12 may access may cover a range of entities such as the Internet or the World Wide Web, a local area network (LAN), a wide area network (WAN), a metropolitan area network (MAN), a telephone network, an intranet, wireless, and other types of networks. Device 12 may be connected to a network by various wired, wireless, optical, infrared, ultrasonic or other communication means. Via a network, device 12 may communicate with a remote server or service center to send and receive data or messages.

Device 12 may include a camera sensor 10 which may be a smartphone camera module for use in daily life. The camera sensor may be arranged to scan QR code, one-dimensional barcode, or any other machine-readable code with the help of certain application. A QR code or barcode may be printed out easily and displayed conveniently.

Device 12 may include a global positioning system (GPS) 18. Sensor 18 may enable a device to get its own location info. Besides GPS, device location may also be obtained using wireless triangulation methods, or other suitable technologies, which may be prepared by a service provider or on-site service facility. Usually for indoor or some urban environment, positioning methods other than GPS are used, since GPS requires a clear view of the sky or clear line of sight for four GPS satellites.

Furthermore, device 12 may have NFC capability enabled by NFC sensor 20. NFC is of short-range wireless communication technology and may be employed to communicate securely with another NFC device. Sensor 20 may also be used to read a radio-frequency identification (RFID) tag. RFID is also a wireless technology for the purpose of transferring data, such as identification data, passively or actively. A RFID chip or RFID tag may be made very small in size, e.g., smaller or much smaller than one millimeter. It may also be manufactured at low price by semiconductor technologies. In applications, a RFID tag may be placed, for instance, on a store counter or a poster conveniently.

Moreover, device 12 may contain an accelerometer sensor 22 to detect its own movement, such as acceleration, deceleration, and rotation. Sensor 22 may comprise accelerometers and gyroscopes, which are already mass produced by semiconductor technologies, and widely used in smartphones and other personal gadgets. With sensor 22, device shaking or waving may be detected and used as user input or command when such functionality is desired.

Inside device 12, output signals of sensors may be transmitted to processor 14, which, employed with certain algorithms, may process the data and act according to predefined programs. For instance, processor 14 may process data from sensor 20, transmit certain messages to a remote transaction center, and then wait for instructions or messages from the center.

Figure 2:
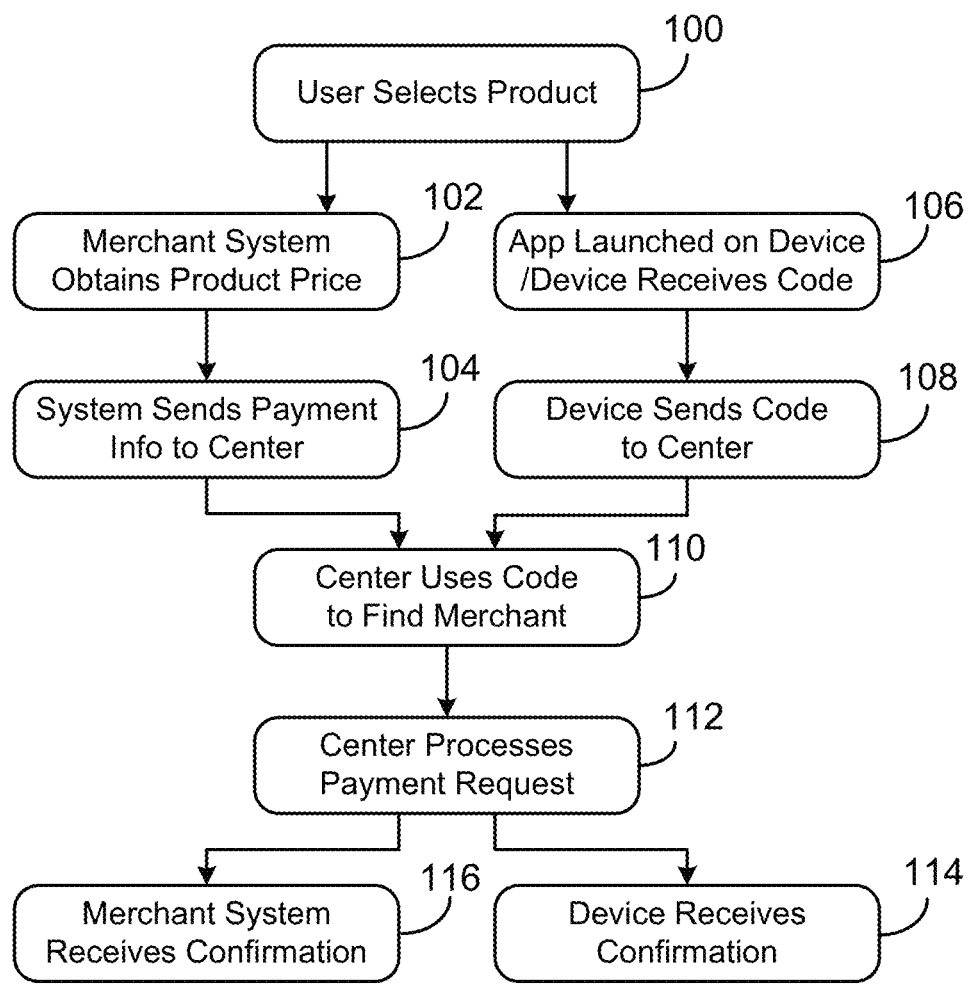
FIG. 2 is an exemplary flow diagram showing one embodiment of in-store mobile payment process in accordance with the present invention.

FIG. 2 is a schematic flow diagram showing one embodiment of mobile payment. Assume that a user is in a store and wants to make purchases. In Step 100, the user selects a product and hands it to a merchant. In Step 102, the merchant scans a product tag to get the price and a merchant system, e.g., a POS system, may record the price. Assume the user wants to pay using his or her mobile device. Then in Step 104, the merchant sends an encrypted message to transaction center via the merchant system. The message contains a payment amount of the purchase and sender info, that is, identification info of the merchant.

Meanwhile in Step 106, the user may start a mobile payment app to prepare for mobile payment. First, the user may manage to get a code associated with the store. A code is designed to represent a store at transaction center. It may be registered at transaction center by a merchant and contain a string of number, character, alphabetic character, and/or sign. After registration, a code is assigned to a store exclusively by transaction center. Duplicate code for another store should be prevented. In order to own a code, an applicant such as a merchant may open an account at transaction center and enroll in a code program. Next, the applicant may apply for code for a business or any entity. The applicant may submit a request for a specific code or let transaction center choose one. A code may have some condition or no condition attached. For instance, the applicant may specify certain condition and add it to a code. Conditions may include a selected geographic location, such as a store location, or a time period in which a code remains effective. The applicant may also apply two codes or two forms of code for one account, e.g., a long code to be obtained by machine and a short code more suitable for manual input. A long code may be arranged distinctive at transaction center. A short code may not be distinctive by itself, but may be unique when it is bundled with certain condition like location or time. For instance, a short code may be a number containing only one, two, or three digits. Back to the flow diagram. After obtaining a code, the mobile device sends it to transaction center in Step 108. The code may be wrapped in an encrypted message.

Now transaction center receives two messages, including payment info from the merchant and the store code from the user. From the merchant message, the center gets merchant info and a pending amount which is scheduled to be transferred to a merchant account or payee account. From the user message, the center receives a code, which may lead to a merchant or payee account, and user info, which may lead to the user's account or payer account. Thus in Step 110, the center uses the code to find a merchant account and prepares fund transfer from the user account to a merchant account. The transfer amount is of payment amount retrieved from the merchant message. But before processing a payment request, both the merchant message and the user message have to be authenticated to make sure they are from legitimate subscribers. After verification procedures, in Step 112, the center starts processing fund transfer. Finally after authorization of payment is obtained, the center sends the user a confirmation message in Step 114, and sends the merchant a confirmation message in Step 116. Then the merchant may give the product to the user. A payment process is completed.

Figure 3:
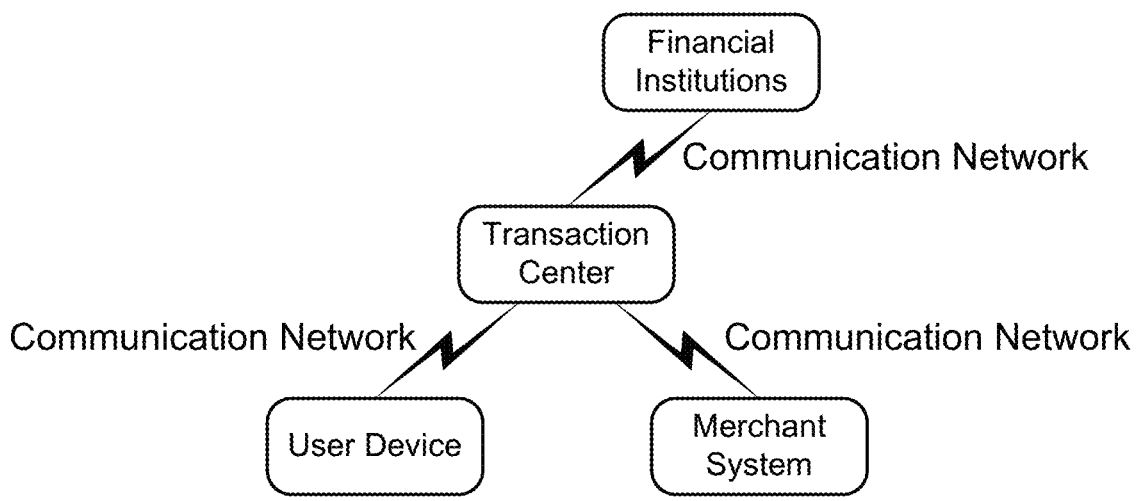
FIG. 3 is an exemplary block diagram which illustrates an in-store mobile payment environment in accordance with the present invention.

FIG. 3 shows a graphic diagram to illustrate an overall in-store mobile payment environment. A user device, such as a smartphone or smart watch, is wirelessly connected to transaction center via a communication network. A merchant system is also connected to transaction center, wirelessly or via cables through a network. Financial institutions, like acquiring banks, issuing banks, credit card processing facilities, are also connected to the center. Specially arranged programs or applications may be installed at the merchant system, user device and transaction center respectively, which are designed to implement mobile payment. As discussed in FIG. 2, a user device sends the center a code, while a merchant system sends it a payment amount. The center uses the code to identify a merchant account and relate the user to the due payment amount. After the authentication process, the center starts contacting financial institutions to get payment authorization.

In order to participate in mobile payment, merchants and users may be required to register and set up merchant accounts and user accounts at transaction center respectively. A merchant account, as payee account, may be configured to receive fund from other accounts. A user account, as payer account, may or may not have deposit of fund for transfer purpose. In order to transfer fund from a user account directly, the account may be pre-deposited with certain amount of money. A user account at transaction center may also be connected to a bank account. Then a user may use the bank account to transfer fund. For users who prefer to using credit card, a user account may be arranged to be associated with a credit card account at a financial institution. Thus instead of performing fund transfer, transaction center may get payment authorization from the institution. For instance, if a user account is connected to a credit card account, the mobile payment would be charged to the credit card account. When transaction center receives a payment request and completes an authentication process for the user and merchant, the center may deal with financial institutions and get authorization of payment for the request. After payment authorization is received, the center may send confirmation messages to both the merchant and user.

It is noted that when a user device sends a code to transaction center, the message may contain a code and brief info of the user; and when the center replies to the user, its message may also be brief, maybe just a merchant name and a payment amount for a quick confirmation. Additionally, a response from transaction center to the user may also contain an authorization request as an additional protective measure. In such a case, a payment process only proceeds when a user approves it. The user may push or tap a button on a user device to authorize the payment request. When a payment process is done, the center may send the user another response as a second message to confirm the transaction. Since these kinds of message are brief and concise, even with not so fast networks, the communication between a user device and the center may still fit the needs.

As discussed, a code plays an important role in proposed mobile payment schemes. It is the code which relates a user account to a merchant account. Moreover, a code is just a representation symbol and only transaction center has its corresponding merchant account number or payee account number. Besides a code, communications between a user device and transaction center and between a merchant system and the center mainly contain a payment amount, merchant ID, and user ID. Thus, there is no sensitive information involved. Therefore, merchant and user accounts at the center, and users' accounts at other institutions are protected and shielded by the center. Leak of sensitive information is prevented, as long as transaction center addresses security issues properly.

Figure 4:
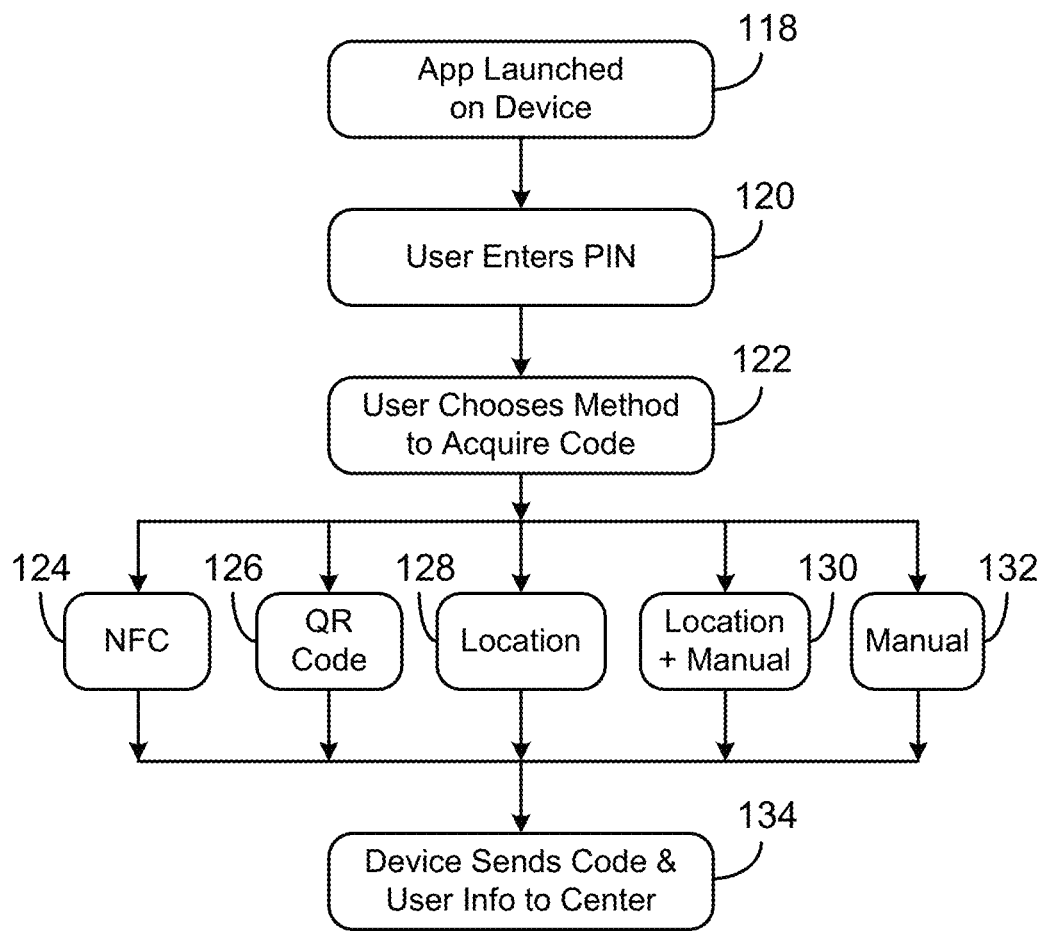
FIG. 4 is an exemplary flow diagram showing embodiments of acquiring a code in accordance with the present invention.

FIG. 4 shows an exemplary flow diagram describing several embodiments for getting a code at a store. As mentioned before, the code is a critical part in the proposed mobile payment process. It should be affordable and flexible for a merchant to provide a code-acquiring mechanism for users. When a merchant is willing to invest in mobile payment environment, multiple mechanisms may be arranged at store to provide different mobile payment methods for users. When a merchant is conservative and hesitant to spend funds, an inexpensive method should be available, which may at least satisfy the basic needs of mobile payment. More merchants may participate in mobile payment, when less costly option is available. In addition, it should be easy and convenient for a user to obtain a code, such that users may be more likely to get accustomed to do it. As a user device may be equipped with different sensors and users may have different preferences, multiple choices provided by a store may improve user experience.

Assume that a user is ready to make a payment at a store. In Step 118, a mobile payment app or application is launched. The app may be created by transaction center or a software company. It may be downloaded from a website and installed on a user device. Assume that the app can be used to make payment via various methods as discussed in below. A user may manually start the app or hold a mobile device close to an NFC device and let the NFC device awake the user device and start the app. Next in Step 120, a user may enter personal identification number (PIN), which may also be arranged at a later step. PIN may be replaced by other authentication means such as fingerprint method, iris scan, or facial recognition. Next in Step 122, a user may select an option to obtain a merchant code or store code. Alternatively, a user device may be set up to choose an option automatically. The objective is to get a code assigned to a store. As discussed, a code for machine use, i.e., to be sensed or obtained by a machine, may be defined without concerns of code length. But if a code is prepared for manual input, it should be relatively not too long, such that a key-in job may not be difficult and challenging. Whether a code is short or long, it has to be distinctive so that no duplicate exists and one code points to one entity only. As there aren't many short codes, a short code may be combined with a distinctive factor or condition, like location, to make it unique. A code may contain a number, a letter, or a sign, or combination of elements. A short code may have a few elements or digits only. Examples of short code may include "1", "12", or "123".

Step 124 is of NFC method. To implement the scheme, a user device has to be equipped with an NFC sensor, such as sensor 20 of FIG. 1, and a merchant has to set up an active NFC device or display an active or passive RFID tag. It may become a quick payment process if both parties are NFC compatible. A user device may be awaken by NFC signals at a POS spot so that there is no need to manually terminate a standby state and start a payment app at the user device. With NFC technology, a code is automatically obtained when a user device is placed close to an NFC device or RFID tag. But some stores may not have NFC devices and some merchant may be reluctant to make investment to set it up. In such a case, RFID tag may be another option. RFID tag is inexpensive and widely used already. It may be placed publicly for users to access. For instance, a store may set up an account at transaction center, get a code to represent the store, and then spend a little to get a RFID tag which contains the code and store info. When a RFID tag is available at a store, a user may place his or her mobile device close to it to acquire code and store info conveniently. After getting a code, in Step 134, a user device may send an encrypted message to transaction center, which may carries code and sender info, i.e., user info. When desired, the message may also contain other info like store ID, which may be transmitted by an NFC device or extracted from a RFID tag. When store ID is provided along with a store code, transaction center may check whether the code is registered under the ID. It may reduce the chance of error due to submission mistake. When store ID is included in a user message, user confirmation or authorization of a pending mobile transaction may be skipped.

In Step 126, a user may choose QR-code method. A QR code may be prepared to present a store code by a merchant. As discussed, a store code is assigned exclusively to a store or any entity at transaction center. After completing store code application, a merchant may create a QR code. Data from the QR code may be arranged to contain a store code and store ID, both of which are registered at transaction center. A QR code may be printed out and displayed beside a POS counter. As all smartphones have a camera module, like camera 10 of FIG. 1, it may be used to scan a QR code using certain scanning application. In practice, a mobile payment app may be designed such that after it gets started, a scan mode is automatically turned on. So a user may aim a camera at a code immediately. It is seen that the cost of QR code method is relative low, as no hardware is needed on the merchant side. After a QR code is scanned, a user device may send code info to transaction center in Step 134.

NFC and QR-code methods rely on a sensor to obtain a code. Step 128 introduces a location method which also relies on sensing techniques, such as GPS, on-site service facility, or service provider. Since location data is distinctive, it may be used as a code to represent an entity registered at the location. For instance, a store may register its location as one form of store code besides obtaining a regular code as discussed in the above. Registered location data may include geographic coordinates plus a value of radius, while a location-based code may comprise the coordinates. So a registered location may cover a circular area centered at a spot, which is defined by geographic coordinates. When location data is registered as code, and it is detected that a user device is at the location, or within a certain distance from the location, the user device may automatically obtain a location-based code. For instance, when a user is at a store and his or her location is determined with adequate precision, the user's device may receive location-based store code right after a payment app is launched. When locations of several merchants are close, and all of them have registered location-based code at transaction center, a user device may receive more than one store code based on the location method. Then a confirmation step may be arranged to avoid hooking up with a wrong store. Assume that a payment app is started and the location of a user or a user device is measured via a GPS sensor, such as sensor 18 of FIG. 1, or triangulation method. The user device may automatically send location info to transaction center. The center may search a lookup table or database and find out which entity registers a code for the location. Then the center may send to the user a list of relevant entities. If there is only one eligible candidate on the list, the user may confirm it. If multiple targets show up on the list, the user may choose one. Next in Step 134, the user may send a message back to the center. For instance, when a list appears on a display of a user device, a user may tap or press an icon to choose one, and then hit a "Send" button. Then the center may receive confirmed merchant info needed for payment process. An entity may register a code of regular format first, which may contain a string of number, letter, or sign, and then obtain a coordinates-based code as a useful alternative. The two types of code support different technologies and provide different options for both merchants and users. It may bring convenience and become a desirable feature.

When the location method produces multiple results, a list of choices shows up on screen and a user has to select one. But making selection may cause difficulty in some cases. To overcome it, a relatively short code may be introduced. Location data plus a short code may be arranged to represent an entity distinctively. Take a store for instance. If a store has multiple POS systems, the location of user has to be accurate enough so that each POS machine can be identified correctly and automatically. As it may be inside a building, positioning means other than GPS may be used, such as WiFi triangulation or ultrasonic method. When positioning scheme is not accurate enough, Step 130 provides a remedy, i.e., location plus manual input of short code, where each short code is arranged unique at the location. For instance, after a payment app is launched, a user may be asked to select or confirm a store after location data is obtained and then submitted to transaction center. But selecting a store alone doesn't solve the problem, because the store has several cashier machines at different POS spots which are close to each other. Then the user may pick a POS system manually by entering a short code. The short code may be displayed beside a cashier machine which processes the user's purchases. In practice, a touch-sensitive screen of a user device may display a list of business or several logos. A user may tap one object to select one business. Then a key-in window may show up on screen, asking for a short code. The user may find a corresponding code on a cashier machine, which may be a one-digit or two-digit number like "2" or "11", assuming one-digit or two-digit codes could provide enough choices. Next the user may enter the code at the user device in Step 130, which means a POS system is chosen among multiple ones. And subsequently, the short code, along with location info and user info, may be sent to transaction center in Step 134.

It is noted that a location-based code represents a store, as an entity, while a short code represents a POS system of the store, as a sub-entity. A sub-entity belongs to an entity and shares an account of the entity at transaction center. Both a merchant and a user may send transaction center a short code in a message. When the center receives location-based data as a merchant code, it may be arranged to look for a short code. When a short code appears in both merchant and user messages, the center may compare them. Only when the two codes are identical, the two messages are related and payer-payee relationship gets established. In such a circumstance, a merchant may set up multiple accounts for all POS systems at transaction center. Each POS system may have more than one code including, for instance, a code for NFC method and a code which combines a location-based code and a short code. Alternatively, it may also be arranged that a merchant doesn't need to register a short code when using it with a location-based code. The reason is that a location-based code already fully represents a merchant account. When transaction center obtains a location-based code and short code in a user message, it may use the former to find a merchant account and then retrieve messages sent from that account. Next the center may search retrieved messages to see which contains a matching short code. Then two messages may be related. Therefore, there may be no need to register a short code, as it is under a registered entity and doesn't affect fund transfer from a user account to a merchant account. There may be no need to notify transaction center before using the short code, when use of the short code is clearly defined and arranged by transaction center.

If NFC, QR code, and location schemes are all unavailable either due to lack of arrangement at a place or lack of capability of a user device, a user may still make payment using an app installed at his or her device. In Step 132, a user may manually input a code, after reading it, for instance, on a store poster. To make it less challenging, a code for use of key-in should be selected carefully so that entering it on a device won't be too much for average users. After a code is fed in, the user device may send it to transaction center in Step 134. As manual entry is prone to human errors, a confirmation step may be arranged, which may be designed to confirm a store or confirm a store name and a payment amount together. After a user makes confirmation, the payment process may continue.

It is noted that the location methods (as reflected in Step 128 and 130) and manual method (as in Step 132) may not cost much for implementation. It is also noted that an entity like a business may select from the following types or forms of code for representation: relatively complex long code for NFC or QR-code method; location data; location data plus a relatively short code; and code for key-in. To support multiple code-acquiring schemes, more than one type of code may be registered and owned by an entity. For instance, a store may register Code 1 for NFC and QR-code methods, Code 2 which contains location data, and Code 3 for key-in use. It may also be designed that a code for NFC or QR-code method stays permanently with a payee account, while a code used for manual entry may be changed by payee at times. For instance, a merchant may register a code for NFC and QR-code methods. The code may remain effective as long as a corresponding merchant account remains at transaction center. The merchant may also register a code for manual input. This code may be changed by the merchant according to the actual practice. If users like the code, it may stay. If users dislike the code, it may be changed. Changing of code may need approval by transaction center. When a store is represented by several codes respectively, it provides multiple options for users and makes mobile payment convenient and more accessible. On the other hand, it may be arranged that NFC, QR-code, and manual methods use the same code, when a code is selected carefully.

To get a code via NFC or QR-code method, a user may place a mobile device close to a NFC device or a RFID tag, or perform a scanning act. Unless another user does the same thing, which may be easily noticed, transaction center receives only one message from payer side at a time. Thus, a user may wave a mobile device or scan a QR code, send a message to transaction center, and then wait for response from transaction center, knowing the center receives only one message, i.e., his or her message. A message from a user to transaction center may be arranged to contain method info besides code and user info, such that transaction center gets to know which code-acquiring method is employed by the user and whether any extra measure should be taken, such as an authorization step. After a payment process is completed, transaction center may send a user a message. The message may mainly serve as a confirmation to remind the user of what happened or how much is paid to a store. User confirmation before a payment process starts, which may be arranged to confirm the name of a payee and an amount of payment, may be omitted for the NFC and QR-code methods, although a user may add such a step if it is desired.

When the location, location plus manual input, or manual input method is involved, more than one user device may send messages to transaction center carrying the same code at the same time period. For instance, two users may open a payment app at the same spot in a store, or key in a posted merchant code within the same time window. Consequently, errors may happen. To prevent such incidents, transaction center may check the method type in a user message first. If location or manual method is cited, the center may send a first message to a user device, which asks the user to confirm the name of payee and whether it is time to pay. For instance, a screen of a user device may show a message from transaction center, which may contain the store name and a question like "Pay now?" to let the user decide. The message may also show a payment amount as another layer to prevent errors, if payment info is already received from a merchant message. There may be arranged two icons "Yes" and "No" beside the "Pay now?" question. When "No" is selected or no action is taken within a given period of time, the payment process may be cancelled. When "Yes" is selected, transaction center may resume the process and send the user a second message to confirm the transaction after payment authorization is obtained or fund is transferred.

FIG. 5 shows a schematic flow diagram of embodiments which describe sending payment info from an in-store merchant system to transaction center. Assume a user hands a product to a merchant and wants to pay it by a mobile device. The user may choose NFC, QR-code, location, location plus manual entry, or manual entry method. The merchant scans a barcode on the product to get the price in Step 136. In Step 138, if a POS system is available to process mobile payment, e.g., it may run a specially designed payment program, the system may send payment info to transaction center in Step 140. Payment info may be arranged to include merchant ID as registered at the center and a payment amount which will be charged to a payer. So transaction center is informed of which entity expects a payment and what amount is involved. If NFC method is used, the message may contain more info such as user ID (as payer ID). User info may come from a user device during an NFC dialogue between the user device and the POS system. Thus with a compatible POS system, it may enable a seamless process: Once price info is obtained, it is sent to transaction center immediately. But a new POS system may be costly and POS system upgrade for mobile payment may be expensive too. So some merchants may be reluctant to move forward, which leads to Step 142 where a card reader is utilized for processing mobile payments.

A card reader may be a regular card-reading device which handles credit card and debit card at a business. A card reader is well accepted and used at many big and small stores nowadays. A merchant may swipe a credit card or debit card to charge an amount on the card account. A card reader may be used for mobile payments with the help of a specially prepared connection card. A connection card may be designed and issued by transaction center. It may be arranged to contain info about a merchant and transaction center. After a connection card is swiped, a card reader may send out a message or prepare to send out a message in Step 144. The message may contain a payment amount, merchant info, and transaction center info. A payment amount, i.e., total purchase amount, may be fed by a POS system or entered by the merchant manually. A message may be sent out after a push button on the card reader is pressed. Merit of using a card reader is that a merchant may rely on the current POS setup. A connection card may be generated by transaction center, after a merchant applies for it and submits needed information. The card may cause a card reader to transmit a message to an acquiring bank of the merchant, which then may relay the message to transaction center according to certain arrangement made in advance. Therefore with no cost or a small cost of connection card, a merchant may use the current equipment to enable mobile payment.

If a card reader is not available either, a merchant may download and install a mobile payment app at a tablet computer or smartphone. The app may be free or cost a little. The merchant runs the app at a computer or smartphone in Step 146, and sends transaction center payment info in Step 148. Using the app, a payment amount may be collected from a store POS system automatically or keyed in by the merchant manually. Thus there are at least two methods which cost a merchant nothing or only a little as shown in Step 142, 144, 146, and 148.

FIG. 6 shows a schematic flow diagram of embodiments which describe receiving replies from transaction center after payment info is submitted there. Again, take a store setting for example. Assume that in Step 150, transaction center completes processing a mobile payment and then sends confirmation messages to a user device and a merchant system respectively. In Step 152, whether a store has a compatible POS system determines how a message is handled. If the POS system has proper capability, a confirmation message may be recorded by the system directly in Step 154, and a transaction process may end in Step 164. If a POS system is not ready to handle messages from transaction center, the next question is whether a card reader is involved in the process, as shown in Step 156. If a store uses card readers for mobile payments, the card reader may be arranged to receive, show and record or print out confirmation messages from transaction center in Step 158. The confirmation message may be routed to an acquiring bank first, and then the bank transmits it to the card reader. If a store doesn't have a card reader, it is assumed that a payment app is running at a device, like a smartphone or tablet computer at the store. The app processes messages received in Step 160 and records them in Step 162. Then the transaction ends in Step 164. Since card readers may already exist at many stores and a payment app for user devices may be free or have a small price tag, a merchant may be able to add mobile payment capability with petty expense.

FIG. 7 depicts a schematic flow diagram of using a card reader and connection card at a store. As discussed, a connection card may be issued to a merchant by transaction center which contains merchant info and transaction center info. Assume a merchant is processing a mobile payment. In Step 166, price info and a payment amount is obtained after scanning a product. The merchant may enter the payment amount at the card reader or the amount may be transferred to the card reader from a POS system automatically. Next in Step 168, the merchant swipes a connection card at the card reader. Consequently in Step 170, the card reader reads it and gets data of the merchant and transaction center. The data and payment amount are encrypted in a message and sent to transaction center in Step 172. In practice, the message may be routed via an acquiring bank before reaching transaction center. Next transaction center receives the info which may indicate that a merchant is expecting a payment of a specific amount from a user. In the meantime, transaction center may receive another encrypted message from a user device which contains a code and user info. After receiving the code, merchant ID and merchant account are retrieved via, for example, a lookup table. Thus the two messages may be connected by the same merchant info. Then, a payment amount indicated in one message becomes related to the user in the other message, i.e., the user should pay the merchant by the cited payment amount. Next transaction center manages to transfer fund from a user account to a merchant account, or get payment authorization from an issuer bank of the user's credit card. After that, transaction center sends confirmation messages to the user device and the merchant system respectively. Then in step 174, the card reader or POS system gets a confirmation message.

Therefore, it is seen that in a store, a merchant may set up a new system or utilize an existing system to handle mobile payments. The cost involved may be manageable, which may encourage more merchants to add in-store mobile payment capability, in particular small business merchants.

Presently, when a user logs on an e-commerce website to purchase products, the user has to provide personal information which is used to authenticate the user. For instance, a user would register and generate a user profile first. The profile may include a real name or legal name of the user and contact info such as a phone number, an email address, and a billing address. If a user doesn't register, he or she would provide personal information at checkout, for instance, when a credit card number is submitted to pay for the purchase.

An online merchant needs a user's personal information for at least two reasons. First, it helps prevent credit card fraud and scams. Second, the online merchant would communicate the info to a financial institution which would authenticate the user and authorize a payment based on the info. The term "financial institution" as used herein, may mean one or more financial institutions, which include an acquiring bank, an issuing bank, a credit card processing facility, etc. When a user uses a mobile payment service for online purchases, the user may be authenticated by his or her mobile device as well as by a financial institution. And the financial institution may get needed personal info from the mobile payment service where the user registers. Resultantly, when a user uses a select payment service, e-commerce merchants may need less personal information about the user. Thus the user may be able to provide less personal info when shopping online.

FIG. 8 is a graphic diagram which illustrates exemplarily an online purchase embodiment involving mobile payments. Assume that a user picks some products for purchase at a website and a purchase amount is calculated by a managing system of the e-commerce site. A purchase amount, as used herein, may include the price of products, applicable taxes, and applicable shipping and handling fees. The website is owned by an online merchant. The merchant may be an individual, a business, or an organizational entity. As used herein, the term "merchant" also represents a managing system of an e-commerce site for simplicity reasons. The managing system is a software system operated via a computer or a server system which may be maintained by the merchant or a service company. The user may have submitted to the merchant a phone number and an email address in a registration process. If not, the user may enter the contact info at checkout. The contact info may be used to call the user regarding delivery matters when needed or send the user a confirmation message or an invoice. At checkout, the user also enters a shipping address and chooses a payment method. Assume the user chooses a select payment service where the user has an account.

As the select payment service may authenticate the user via password, fingerprint, iris scan, facial recognition, or other suitable means, it may pass an authentication result to the online merchant such that the merchant doesn't need to have complete user information for authentication purpose. For instance, the user may only need to submit to the merchant a shortened name to represent him or her, instead of a first name plus a surname like the user would usually do. As used herein, a shorten name means a shortened first name plus a surname or a first name plus a shortened surname. A shortened first name or surname may be of the initial of the first name or the surname. Optionally, a shortened first name or surname may also contain the first two or more letters of the first name or the surname. In discussions below, the initial is used as a shortened first name or surname for illustration purpose only, while other forms of the shortened name are also applicable and may be used by users. If needed, a shortened name may also include the initial of a middle name. For instance, if a user's name is John Doe, his shortened name may be J. Doe or John D. If a user's name is John Max Doe, his shortened name may be J. Doe, John D., J. M. Doe, or John. M. D. As a shortened name doesn't contain the complete information of a name, the merchant may ask the user to provide a registration address, which is an address registered at the mobile payment service. The registration address may be the residential or billing address of the user. Then the mobile payment service may identify the user using the shortened name and the registration address, as the address plus a shortened name may be distinctive enough at the mobile payment service in most cases. To avoid any potential errors or confusion due to the incomplete name, the merchant may also issue a short code to the user. Then the mobile payment service may use the short code and the registration address to find the user. As a short code is not always necessary, options are arranged for a user to have or skip the short code in discussions below.

FIG. 8 illustrates what a user is required to provide for online shopping in one embodiment. The user may only need to submit a shortened name, a shipping address, a phone number, an email address, and a registration address relating to transaction center, assuming that transaction center represents the select payment service. As used herein, transaction center may mean a remote payment service facility or a server or a software system operated at the facility. If a registration address plus a shortened name correspond to multiple accounts at transaction center, the user may be asked to choose a different form of shortened name, such as changing from "John D." to "J. Doe". In addition, the user may also add the initial of his or her middle name. Then the shortened name becomes, for instance, "John M. D."

Alternatively, the user may also provide a phone number or email address which is registered at transaction center, instead of a registration address. The registered phone number and email address are similar to the registration address in terms of uniqueness at transaction center. In addition, since the online merchant may need the user's name if a dispute happens later, optionally, an agreement may be made between the merchant and transaction center. The agreement may require the center to give the merchant the name of the user under given conditions. The user may also be asked to authorize the center to send his or her name to the merchant under the given conditions before completing purchasing steps.

FIG. 9 shows an exemplary interface 60 to illustrate an online purchase embodiment. The interface shows a screen view presented on a user device after a user logs on an e-commerce website or opens an e-commerce app. The user device may be a mobile device, such as a smartphone or a tablet computer, or a regular personal computer like a desktop computer or laptop computer. Windows 24, 26, 28, 30, and 32 are input places where the user enters basic user information. Two options are provided for name choices. One of them may be selected. The user may enter a first name and a surname in windows 24. The user may also enter a shortened name in window 26 under certain circumstances. If the user uses a select payment service which participates in a given program, the user may use a shortened name and enter it in window 26. If the user uses a credit card, debit card, or a payment service which doesn't participate in the given program, the user is advised to enter his or her first name and surname in windows 24. Otherwise, authentication issues may occur at the payment stage. For clarification purpose, a message (Not shown in the figure) may be posted in interface 60 to let people know that a user may use a shortened name if the user chooses a select payment service as a payment method. For instance, an exemplary message "Shortened Name is Optional for Users Who Use Select Payment Service for Purchases" may be presented in the "User Info" area to notify users. Optionally, a list of participating payment services may be provided via the interface.

Assume that the user uses a participating payment service and transaction center represents the service. Hence the user has options to enter or not enter his or her first and last names in windows 24. Assume that the user doesn't enter a name in windows 24. Instead, the user keys in a shortened name in window 26. The user's name or shortened name would be sent to transaction center afterwards. Windows 28 and 30 are configured for contact info like phone number and email address. Window 32 is for entering a shipping address. Checkboxes 34, 36, 38, 40, 42, and 44 provide additional options for the user to choose. The user may select which information would be shared with transaction center. For instance, if checkbox 42 is selected, it means the user allows sharing the shipping address with transaction center. But if checkbox 44 is selected, it means that the user doesn't allow sharing the shipping address with transaction center. If a pair of yes and no checkboxes are not checked, it may be considered that a user allows sharing the info. The checkboxes provide another layer to protect a user's privacy. If a user doesn't allow sharing certain info with transaction center, the info would not show up in a payment review or confirmation message prepared by transaction center. If any of the basic user information is previously submitted in a registration process, the corresponding window area may be populated automatically so that a user doesn't need to key in the info again.

Windows 46, 48, and 50 are configured for the user to provide account info relating to transaction center. Three options are prepared. The user may choose one or more options to enter a phone number, an email address, and/or an address which are registered at transaction center. As each of the items may be used along with a name or a shortened name submitted to the merchant, a corresponding account may be found at the center. The user may tap or click a button 52 to verify his or her account at the center. After button 52 is activated, the merchant or the managing system of the e-commerce site transmits to transaction center information obtained from applicable windows 24, 26, 46, 48, and 50. If the center fails to locate a user account, it sends a message to the merchant asking for more or correct information. Then a message may show up in interface 60 requesting a response from the user. The user may submit new info and/or a different shortened name. As an exception, a user may not need to provide account info relating to transaction center via windows 46, 48, and 50, if the managing system contains a payment module jointly developed with the center. Scenarios with a payment module will be illustrated after the following discussions.

Back to FIG. 9. After the user's account at transaction center is found, the center sends a message to the user's mobile device or a registered device. For instance, a request may appear when the user opens a payment app designed by transaction center or logs in his or her account at the center. The request prompts the user to confirm a payment setup at the e-commerce site. After a positive reply is received from the user, the center sends a verification result to the e-commerce site, which confirms a valid payment account at the center and also means that the user is authenticated. Next, the managing system of the e-commerce site is ready to issue a short code or a long code in window 54 or 56.

If the user enters the phone number, email address, and/or address in windows 46, 48, and 50, the managing system issues a short code, which may contain one or several elements, preferably less than four or five elements. The element includes a numerical number, a letter, or a sign or icon. For instance, "1", "23", or "672" may be examples of the short codes. If the user doesn't enter any info in windows 46, 48, and 50 and doesn't want to share user or shipping-related info with transaction center, the user may be authenticated at a later time and subsequently, a long code may be generated and given to the user. Unlike a short code, a long code has to be distinctive by itself at transaction center and thus may be a relatively long string of the elements. A code may show up in windows 54 or 56 after the user taps or clicks a button 58, an interactive code-requesting icon. Next, the user may send the code to transaction center to start a payment process.

Alternatively, a user may also choose to skip the code by tapping or clicking an interactive button 94. When a code is not involved, a step to send the code to transaction center is eliminated, which simplifies the payment procedures. A code may be omitted if the merchant has an address, a phone number, or an email address which is registered at transaction center. Transaction center may find the user using the shortened name plus the address, phone number, or email address. Similarly, if the user allows sharing with the center some user info or a shipping address, the user may also opt for skipping the code. Transaction center may find the user using the info and the shortened name.

FIG. 10 shows a schematic flow diagram of online purchase and payment embodiments. A user logs on an internet merchant's website in Step 176. After the user selects some products, a managing system of the website calculates a total purchase amount in Step 177. During the checkout, the user may submit basic user information in Step 178, such as a shortened name, a phone number, an email address, etc. The basic user info may have been entered in a registration process earlier. Next in Step 180, the managing system monitors whether the user submits any account info relating to transaction center. The account info may include a phone number, an email address, and a registration address which are recorded at transaction center. If at least one item of the account info is submitted, the managing system, on behalf of the internet merchant, issues a short code to the user in Step 182 and asks the user to send the short code to transaction center in Step 184. In the meantime, the managing system communicates the short code, the purchase amount, and the merchant's account info to transaction center in Step 186. If the user allows sharing certain user info with the center, the allowed info is sent there too. Alternatively, as the user provides some registration info relating to transaction center, the code may be skipped. If the user opts for skipping the code, both the user and the merchant send to transaction center a message which doesn't contain a code.

If the user doesn't provide any account info in Step 180, the managing system checks in Step 188 whether the user allows sharing any of the basic user info with transaction center, like a phone number, an email address, or a shipping address which the user have submitted. If the user allows sharing the info in Step 188, the managing system issues a short code to the user in Step 190 and asks the user to send the short code and at least one item of the allowed info to transaction center in Step 192. The managing system sends to transaction center the short code, the purchase amount, the allowed user info, and the merchant's account info at the center in Step 194. Alternatively, as the user allows sharing some of the basic user info, the code may be skipped. If the user opts for skipping the code, both the user and the merchant send to transaction center a message which doesn't contain a code.

If the user doesn't allow sharing basic user info in Step 188, the managing system issues the user a long code in Step 196 and asks the user to transmit the long code to transaction center in Step 198. The managing system sends transaction center the long code, the purchase amount, and the merchant's account info at the center in Step 200.

FIGS. 11-A, 11-B, and 11-C show interface examples to illustrate three online purchase embodiments respectively. After the user activates button 58 in interface 60 of FIG. 9, a short code or long code is generated and shows up in windows 54 or 56 there. Then an interface 62 may appear at the user device as shown partially in FIG. 11-A. The interface is designed for cases when the user's account info at transaction center is submitted. In a window 64, an exemplary short code "27" is displayed and a header in the interface asks the user to send the short code to transaction center via a payment app. The message to transaction center is of a payment request. The payment app is designed by transaction center and installed at the user device. If the user skips the code, the message in interface 62 may ask the user to send a payment request to transaction center without mentioning and displaying a code.

When the user doesn't submit any account info related to transaction center but allow sharing certain user info like a shipping address with the center, the user gets a message as shown in FIG. 11-B. In an interface 66, a header asks the user to send transaction center an exemplary short code "36" plus the shipping address, which are shown in a window 68 as a reminder for the user. Again, if the user skips the code, the message in interface 66 may ask the user to send the shipping address via a payment app without mentioning and displaying a code.

If the user doesn't submit any account info related to transaction center and doesn't allow sharing user info with the center, a long code is issued to the user. The user is asked to send the long code to transaction center as shown in FIG. 11-C, where a window 72 in an interface 70 displays an exemplary long code. The user is expected to send the long code via a payment app of transaction center. Alternatively, the managing system may generate a QR code which contains the long code, the purchase amount, and account info about the merchant at transaction center. The user may scan the QR code after opening the payment app. Once the scan is complete, the payment app sends transaction center the long code, the purchase amount, the merchant info, and account info of the user at the center.

The user may send transaction center a short code or long code via a payment app. Alternatively, the user may log in an account at transaction center via the cloud or website of the center and submit a code and other info needed.

After receiving a code, the user may open a payment-request page of the payment app. A mobile device like a smartphone or a tablet computer may be used. FIG. 12 shows an exemplary payment-request page in an interface 74. If the user gets a short code from the e-commerce site, the code goes to a window 76. If any user info such as a shipping address is required to send to transaction center, the info is entered in a window 80. If the user gets a long code, the code goes to a window 78. After it is done, the user may tap a "Send Info" button 82 to transmit the request to transaction center. If a QR code is issued, the user may tap a "Scan QR Code" button 84 to scan the QR code and then relevant info is sent to transaction center automatically after the scanning procedure is finished.

If the user submits certain account info relating to transaction center and skips the code, no input is needed in the windows in interface 74. The user may just tap button 82 to send a payment request to transaction center. If the user doesn't give any account info relating to the center, but allows sharing some user info, and skips the code, no input is needed for windows 76 and 78. But the user has to enter the allowed info in window 80. The user may tap button 82 after filling the window. When the user logs on transaction center's website to submit the payment request, the user may do similar steps to input corresponding information except copying and pasting a QR code when the QR code is issued.

FIG. 13 shows a schematic flow diagram of a payment embodiment. Assume that a user selects some products on a shopping website using a user device, gets a purchase amount, and then navigates to a checkout interface. The user chooses to use a shortened name. The merchant issues a short code to the user after receiving some account info relating to transaction center, e.g., a registration address. Then the merchant and the user send a payment request to transaction center respectively. In Step 202, transaction center receives a message from the merchant. The merchant message includes the short code, the shortened name, the registration address, the purchase amount, and account info about the merchant at the center. In Step 204, transaction center receives a message from the user. The user message includes the short code and account info about the user at that center. It is required that both the merchant and the user have an account at transaction center. Both register with a name and an address to support payment transactions in a regular way. For instance, the user may register with a first name and a surname.

As there may be one or only a limited number of accounts which have the registration address, the center may use the address to find the one or the limited number of accounts. Then the center uses the short code to find the user message which also has the code. Thus the user's account at the center is obtained. Step 204 also serves as an authentication process which verifies the user, since the user sends the message via transaction center's payment app and the login step may serve as an authentication procedure. Moreover, if the user uses a mobile device, which carries the user's phone number and is accessible only after a password or pass code is entered, fingerprint is verified, facial recognition is performed, or iris scan is completed, it adds additional security measures. In addition, if the user logs in an account to submit the payment request on transaction center's website, the login process serves as an authentication step too. Hence, the merchant may rely on transaction center and doesn't need to do perform user authentication. The merchant and the user are connected in Step 206 and it is determined that the user should pay the purchase amount to the merchant.

Transaction center sends a payment review to the user in Step 208. The review may contain the shortened name, the name of the merchant, the purchase amount, etc. As the user's name is not mentioned by the merchant, it is important to let the user review or even verify the shortened name to avoid fraud and errors. The review may show up in an interface of the payment app or after the user opens the payment app at the user device. The user may go over the shortened name, the merchant name, the amount to be paid, etc. Then the user may respond and confirm the payment by, for instance, tapping an interactive confirmation icon configured in the interface. In addition, if the user allows sharing a shipping address, a phone number, and an email address with the center, the center may receive the info from the merchant message and include it in the payment review too. Hence, the user may also check the shipping address and contact information before confirming the purchase info. If the user does it on the center's website, the user may review and confirm the information in a similar way. The center receives a positive response in Step 210 and starts implementing a payment process in Step 212.

If the user's account at transaction center is connected to a checking account at a bank, transaction center may initiate fund transfer from the checking account to the merchant's bank account or the merchant's account at the center. If the user's account is associated with a credit card account at a financial institution, transaction center may get payment authorization from the institution. After obtaining the authorization, transaction center sends a confirmation message to inform the merchant of a successful payment transaction. The center may also send a message to the user to confirm that the purchase amount is paid. If the user has submitted multiple credit cards at transaction center, the user may have options to use any card for a purchase. For instance, the payment review message may contain a drop-down list of the credit cards for the user to select.

It is noted that the user may also submit other info such as a phone number or an email address registered at transaction center, instead of a registration address. With the phone number or email address, transaction center may perform the same or similar steps to connect the merchant and the user. In a similar way, when the user doesn't provide account info related to transaction center but allows sharing some user info, such as a shipping address, with transaction center, the center may still connect the merchant and the user. For instance, transaction center may ascertain which user message contains a shipping address that matches info obtained from a merchant message. Then the center may use either the code or a shortened name to find the user. When the code is used to identify the user, the shortened name may serve as a double check.

Moreover, above embodiments also apply to cases when the user skips the code. For instance, when the user submits a registration address, both the merchant message and the user messages contain it. Transaction center may use the registration address to find one or a limited number of user messages. Next the center may use the shortened name to find the target user message and then connect the user and the merchant.

FIG. 14 shows a schematic flow diagram of an online purchase embodiment. After a user selects several products on a shopping website, a merchant or a managing system of the site calculates a purchase amount in Step 214. At checkout, the merchant checks info submitted by the user in Step 216. Assume that the user uses a shortened name. The merchant interacts with the user via an interface on a user device like a smartphone or desktop computer. The interface may be a web page of the e-commerce site. The interface may also be an app page if the user device is a gadget like a smartphone. Info entered via the interface by the user is transmitted to the managing system. Assume that the user selects a participating payment service listed in the interface and transaction center represents the service. In Step 218, the user enters in the interface a registration address, which is the address submitted at transaction center. After receiving the registration address and a request for a code from the user, the merchant issues a short code in Step 220. As the user only provides a shortened name, the merchant doesn't know the user's real name, i.e., at least a first name and a surname.

The merchant asks the user to send the short code and a payment request to transaction center in Step 222. Meanwhile, the merchant sends a payment request to the center in Step 224. The payment request from the merchant contains the short code, the shortened name, the registration address, the payment amount, a shipping address if the user allows sharing it with the center, and account info about the merchant at the center. After receiving the payment requests, transaction center connects the merchant and the user, combines info from both parties, and sends the user a message asking for payment review in regard to the purchase. Subsequently, the center receives a positive response from the user and then proceeds with the payment process. Transaction center sends payment confirmations to the merchant and the user after payment authorization is received from a financial institution. The merchant receives the payment confirmation in Step 226 and then ships the products to the user in Step 228.

It is noted the above embodiment applies not only to scenarios with a short code and a registration address, but also to other scenarios which are discussed above. For instance, the other scenarios may include a short code plus other registered info relating to transaction center; a short code plus certain user info given to the merchant; a shortened name, no code, plus certain registered info relating to the center; a shortened name, no code, plus certain user info given to the merchant; a long code, etc. In all these cases, the user has two options: Submit a first name and a surname in a regular way or submit a shortened name to enhance privacy protection.

Figure 15:
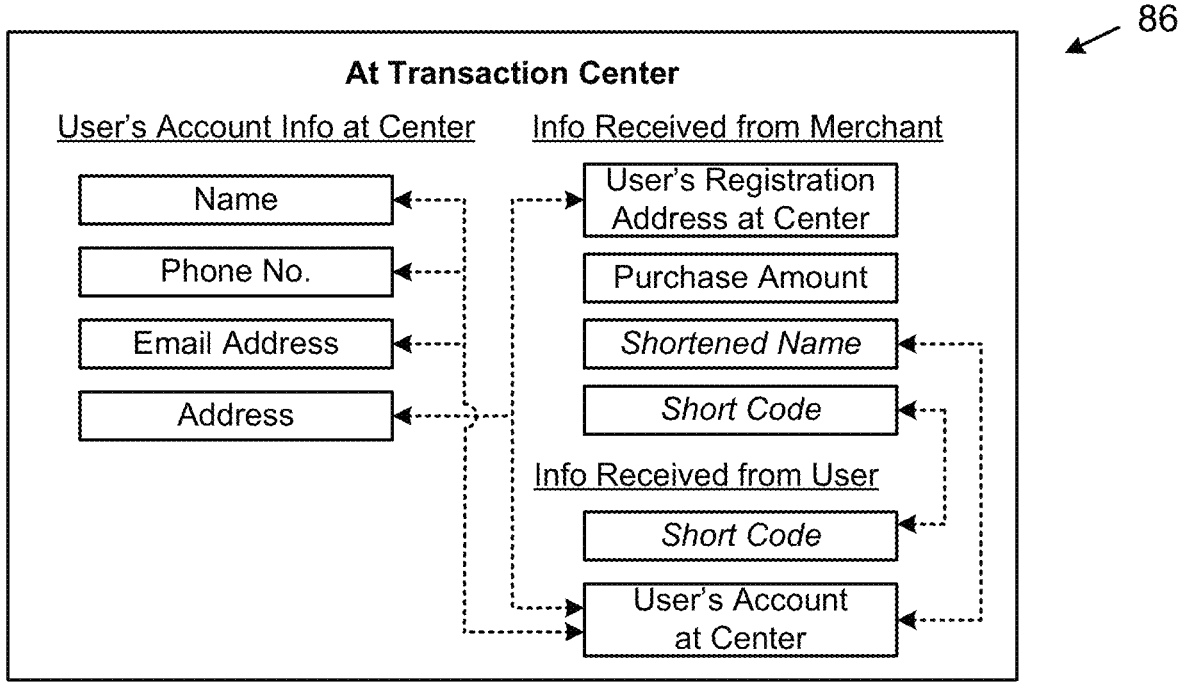

FIG. 15 is an exemplary diagram which illustrates a payment embodiment. A diagram 86 summarizes information which transaction center gathers. Some information is retrieved from a user's account at the center. Other information is obtained via a payment request from the user and another payment request from an online merchant. The user's account info includes a name, a phone number, an email address, and an address, which are required for payment transactions. The name may contain at least a first name and a surname or last name. In addition, the name may also contain a middle name or the initial of a middle name. The address may represent the billing address of the user and may also be called registration address herein. Assume that the user submits a shortened name and the registration address to the merchant. Thus, the merchant message for the payment request includes the registration address, a purchase amount, the shortened name, a short code, and account info about the merchant at the center. The user message contains the short code and account info which includes an account number and optionally the name of the user registered at the center.

In the figure, the dotted lines links items which are used by transaction center to connect the merchant and the user. The dotted lines also link items from the user's account at the center and an item from the user message. Transaction center may start processing the payment requests after receiving them from the merchant and the user. The merchant message may arrive at the center before the user message, as the merchant message is sent automatically by a managing system of the merchant. First, transaction center retrieves the registration address and the short code from the merchant message and then selects one or more accounts which have the registration address from a user database at the center. Then, the center searches for user messages sent from the selected one or more accounts and ascertains which one contains the short code. As the user message contains the short code, the user's account may be found consequently. After that, the center may double check the info by comparing the shortened name against the name registered at the center, e.g., checking whether J. Doe matches John Doe. Then the purchase amount is attached to the user and the center may start a payment process. For instance, transaction center may send a payment review to the user asking for confirming the purchase information.

It is noted that transaction center uses a registration address to narrow a search and find one or more relevant accounts first. Then the center uses a short code to single out a target user account. Thus, when the registration address is replaced by a phone number or email address registered at transaction center, the same method applies. Furthermore, a registration address plus a shortened name may work in the same manner and be utilized to find a target user account. For instance, a shortened name "J. Doe" may lead to John Doe's account among one or a limited number of accounts without the help of the short code. Thus, when a user submits to a merchant certain account info relating to transaction center, such as an address, a phone number, or an email address, the user may skip the code.

Figure 16:
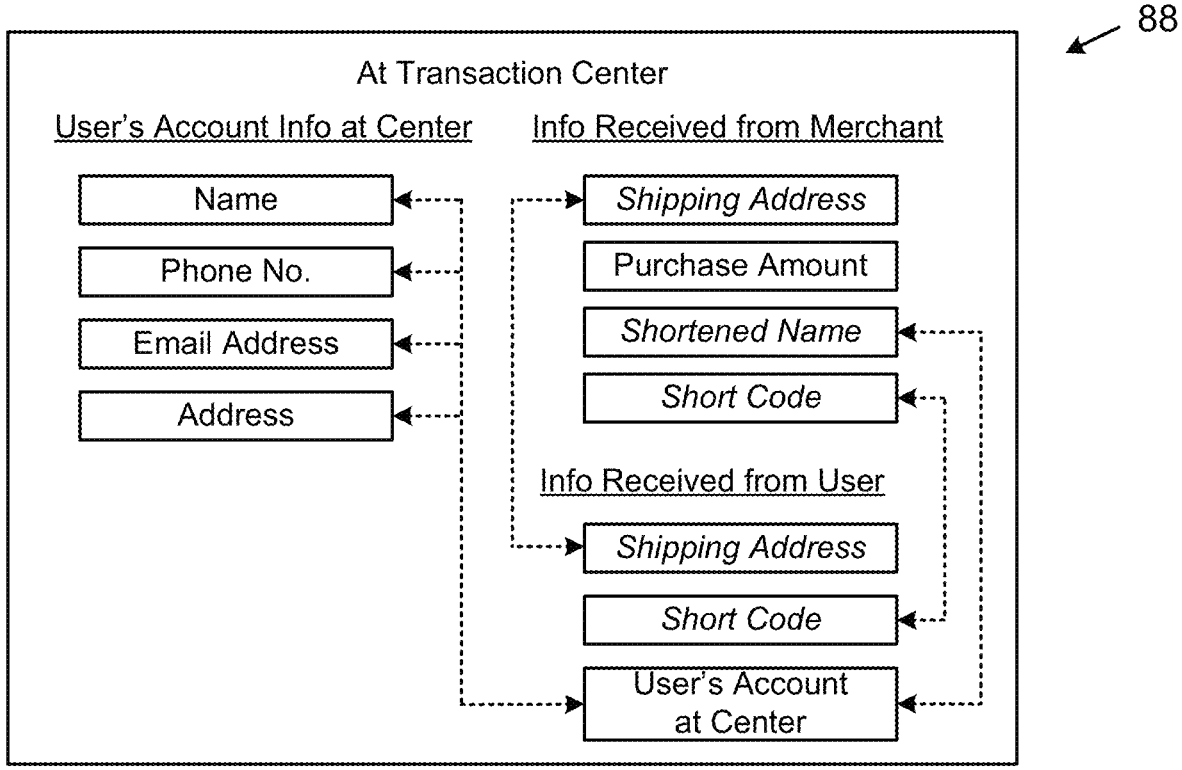

FIG. 16 shows an exemplary diagram 88 which illustrates a payment embodiment. Assume that a user doesn't give an online merchant a registration address or other account info registered at transaction center. The user uses a shortened name and allows sharing a shipping address with the center. Then a payment request from the merchant may include the shipping address, a purchase amount, the shortened name, a short code, etc. A payment request from the user includes the shipping address, the short code, and account info which includes an account number and optionally the name of the user registered at the center. After receiving the merchant message, transaction center retrieves the shipping address, uses it to narrow a search, and finds one or more user messages which have the shipping address. Next the short code is used to find the user. The center may also compare the shortened name to the name of the user as a double check. Then the merchant and the user are connected and the purchase amount is scheduled to be paid by the user.

When the user allows sharing a phone number or an email address with transaction center, instead of the shipping address, transaction center may also connect the merchant and the user using the contact info plus the short code. Furthermore, when the user allows sharing the shipping address, phone number, or email address, the user may skip the code. For instance, transaction center may use the shipping address and the shortened name to find the user message and then the user account at the center without the code.

FIG. 17 shows an exemplary diagram 90 which illustrates a payment embodiment. Assume that a user doesn't give an online merchant any account info related to transaction center and doesn't allow sharing a shipping address or other user info with the center. The user is eligible to use a shortened name, as transaction center, representing a select payment service, is chosen by the user as a payment method. The merchant issues the user a long code. The long code is configured distinctive at transaction center. Consequently, a payment request from the merchant contains a purchase amount, the shortened name, the long code, account info about the merchant at the center, etc. A payment request from the user includes the long code and account info about the user at the center. As both messages have the long code, the center may use it to connect the merchant and the user and attach the purchase amount to the user's account. Again, the shortened name may be used to compare against the name of the user which is registered at the center for double-check purpose. When a payment review is sent to the user for confirmation, the review may contain the shortened name as a reminder to the user. Since the user doesn't allow sharing user info with transaction center, the review doesn't include a shipping address and other user info.

FIG. 18 shows an exemplary diagram 92 which illustrates a payment embodiment. Similar to embodiments discussed above, a merchant and a user have registered at transaction center. The merchant represents an e-commerce retail website. The user selects some products on the website and wants to pay a purchase amount to the merchant. The user uses a shortened name, as transaction center, which represents a select payment service, is chosen as a payment method. In comparison to embodiments described above, transaction center only receives one payment request, which is sent from a payment module embedded in a managing system of the e-commerce site. The request may also come from the managing system instead of the module. The module may be a sub-system or a component of the managing system. It stores certain information about the user provided by transaction center. The module may be developed mainly by transaction center or jointly by the merchant and transaction center. The module is installed in the managing system of the e-commerce site with approval from both parties.

Diagram 92 illustrates what transaction center obtains after receiving the payment request from the module. Like the previous cases, the left part of the diagram shows account info about the user which includes a name and certain contact information. The name may include at least a first name and a surname or last name. The contact info includes a phone number, an email address, and a billing address. The right part of the diagram shows info which is retrieved from the request message. The user doesn't need to send a separate request to transaction center any more, which simplifies the process. The request message includes a purchase amount, the shortened name, merchant account info which may include the name and an account number of the merchant at the center, and user account info which may include an account number and optionally the name of the user registered at the center.

Since the message contains account info about the merchant and the user, transaction center may locate their accounts right away. Next the center makes the user a payer and attaches the purchase amount to the user's account. It is noted that although transaction center doesn't need the shortened name to further confirm identity of the user, the shortened name is still useful for all parties. For instance, when the center sends the user a payment review, which summarizes the purchase, it may include the shortened name as a reference and let the user double check it.

The payment module, integrated with or embedded in the managing system of the e-commerce site, has several features. First, the module may store certain info and because the info is encrypted, it is not accessible to the managing system, i.e., the merchant. The encrypted info may include account info about the user at transaction center, such as the user's account number and name at the center. The user may provide a credit card number to transaction center. The center may keep the credit card number or discard the number after certain arrangements. The latter option is configured for protecting the user's interest. If the credit card number is not kept at the center, it may be stored at the payment module. Then, for security reasons, a payment tokenization method may be employed. For instance, the credit card number stored at the module may be a created card number that is not the actual one. A corresponding financial institution may get the actual credit card number from the created card number using a cryptographic key. Thus neither transaction center nor the merchant has the real credit card number. The created card number is also not useful for other parties since they don't have the cryptographic key. Thus payment tokenization techniques may be used to provide additional security for payment transactions.

Second, the payment module may communicate with the managing system and receive certain info from the system, such as a name or a shortened name which a user enters, a purchase amount to be paid, a shipping address, other user info, etc. On the other hand, the managing system may get info including the encrypted contents from the module when needed. For instance, the system may retrieve the user's account info relating to transaction center, whether it is encrypted or not, and include it in a message addressed to the center.

Third, the module may communicate with transaction center. The module or the managing system may send to transaction center the created card number (If the center doesn't have it) along other information which is illustrated in diagram 92 exemplarily. Transaction center may send a credit card number or a created card number, a purchase amount, and info about the merchant, who is the payee, to a corresponding financial institution after receiving a payment request from the merchant and subsequently a confirmation from the user.

The payment module or the managing system may also be configured to communicate with a remote data facility or a data structure which works for transaction center and is built based on cloud technologies. The data facility or data structure, accessible via communication networks and maintained by a data service company, may help facilitate the data needs and management of transaction center. For instance, the cloud of transaction center may provide service to merchants and users based on the remote data facility. Thus, the cloud of the center makes it more convenient and reliable for clients to contact transaction center and perform payment transactions.

After a merchant installs a payment module in a managing system, a first payment icon, which represents transaction center, may show up on a checkout page of a shopping website. Alternatively, transaction center be included in a drop-down list of payment methods on the checkout page and a second payment icon may be displayed there. Assume a user picks some products on the website and then navigates to the checkout page to conclude the purchase. A purchase amount is calculated and displayed there. The user uses a shortened name. Contents of the checkout page are presented in an interface of a user device. The user may activate the first payment icon or select transaction center in the list and then activate the second payment icon. Next, the managing system instructs the payment module to start working. The managing system or the module may send commands to the user device and cause the user device to open a window in the interface. As there are several embodiments, we discuss them separately. In the embodiments, assume that the user allows sharing certain user info with transaction center, such as a shipping address and/or some contact info.

Embodiment 1

If transaction center allows the user device to authenticate the user, for instance, via the password, pass code, fingerprint, facial recognition, iris scan, or other suitable methods, a message in the window or the interface may ask the user to start an authentication process. The user device may be a mobile device like a smartphone or a non-mobile device like a desktop computer. The test result is sent to the managing system automatically. Thus, the merchant has no need to authenticate the user again. If the user fails the test, the purchase process pauses and the user may be asked to use another payment method. Assume that the user passes the authentication step. After that, the managing system sends content items to the user. The content items are displayed in the window, which may include purchase info, such as the name of the merchant, the shortened name, the purchase amount, items selected, a shipping address, and other contact info. For instance, the window may display "At ShoppingXYZ.com, J. Doe's Purchase Amount Is $75.99" and other information. It is noted that the shortened name is presented for review by the user. Optionally, as a reminder, a message may be configured in the window. The message may indicate or emphasize the use of the shortened name. For instance, the message may say "Shortened Name Used", "Shortened Name Selected", "Shortened Name in Use", etc. The user may also select a credit card for the purchase from a drop-down menu in the window, if the user stores info about multiple credit cards.

If everything is correct, the user may tap a pay or confirmation button to proceed. After the pay or confirmation button is tapped, the module or managing system sends a payment request to transaction center, which then transmits a request message to a corresponding financial institution.

Alternatively, the authentication process may be arranged after the user reviews and confirms the purchase info. For instance, purchase info may be sent to the user and displayed in the window first. After the user reviews the info and then taps a pay or confirmation button, another window may appear asking the user to start an authentication process. Once the authentication process is complete, an okay sign may show up in the window and in the meantime, the result is sent to the managing system. Then, the system or the module sends a payment request to transaction center.

Embodiment 2

If transaction center performs authentication, the module or the managing system may start contacting the center or the cloud of the center and send a payment request. The payment request contains purchase info as discussed above, such as the content items listed in the right part of diagram 92 in FIG. 18. After receiving the payment request, transaction center sends data to the user device directly or via the managing system. The user device may be a mobile device like a smartphone or non-mobile device like a desktop computer. The data contains content items to be presented in the window. The window may show a title or header indicating transaction center and asks the user to enter a password or pass code. If the user already signs in an account at transaction center, the user may enter a pass code. Alternatively, if the user device carries a phone number registered at the center, the user may also enter a pass code. If, however, the user doesn't sign in the account and the user device doesn't carry the registered phone number or other proper identification, the user may enter a user ID or an email address registered at transaction center and then key in a password. As used herein, a pass code may contain a group single digit numbers, while a password may contain a group of numbers, letters, and symbols or signs. Next, the window presents a payment review page after the login step. Purchase info, which transaction center received from the managing system or the module, is sent from the center to the user device. The purchase info appears on the payment review page and includes the name of the merchant, the shortened name, the purchase amount, a shipping address, other contact info, etc. Optionally, as illustrated above, a message may be configured in the window to indicate or emphasize the use of the shortened name. If everything is correct, the user may tap a pay or confirmation button to proceed. After the button is tapped, a signal is sent from the user device to transaction center. The signal prompts the center to transmit a payment message to a corresponding financial institution.

Embodiment 3

If transaction center allows the user device to authenticate the user, for instance, via the password, pass code, fingerprint, facial recognition, iris scan, or other suitable methods, the user may also use another user device to do authentication. Assume that the device used for online shopping is a first device and the user has a second device. Both devices may be either a mobile device like a smartphone or a non-mobile device like a desktop computer. The user uses the second device for authentication. For instance, after the user activates the first or the second payment icon on the checkout page, which is presented on the first device, the managing system or the module obtains the signals and sends the first device content items to be displayed in the window. The content items include purchase info, such as the name of the merchant, the shortened name, the purchase amount, a shipping address, other contact info, etc. For instance, the window may display "At ShoppingXYZ.com, J. Doe's Purchase Amount: $75.99" and other information. As the shortened name is used, as a reminder, a message may be configured in the window optionally. The message may indicate or emphasize the use of the shortened name, such as, "Shortened Name Used", "Shortened Name Selected", "Shortened Name in Use", etc. Optionally, a drop-down menu may be presented in the window for the user to choose a credit card for the purchase, if info about multiple credit cards is stored.

If everything is correct, the user may tap a confirmation button to proceed. As the second device is used to perform authentication, a message is sent from the first to the second device via blue tooth, NFC, communication networks, or other suitable communication means. Then the user may open a payment app or program at the second device. An authentication message may appear in the interface of the payment app or program. Next, the user may start an authentication process using one of the aforementioned methods. The test result is transmitted to the managing system automatically. If the user fails the test, the purchase process pauses and the user may be asked to use another payment method. Assume that the user passes the authentication step. Subsequently, the module or the managing system sends a payment request to transaction center, which then sends a request message to a corresponding financial institution. Transaction center sends the merchant and the user payment messages after receiving authorization info from the financial institution.

In embodiments illustrated above, a user may opt to use a shortened name in online shopping activities. Alternatively, a user may further reduce disclosure of personal information by using a nickname. The nickname may replace a shortened name and thus doesn't reveal a user's a first name or surname. FIG. 19 shows an online purchase embodiment which describes an exemplary interface 96 configured for a user device. The interface may reflect a webpage or an app page of an e-commerce site partially. In the interface, an online merchant or a managing system of the e-commerce site provides two options for a user. The user may enter a name in windows 91 or a nickname name in a window 93. The name may include at least a first name and a surname. A nickname, unlike a shortened name, may provide no information about a user. However, when a payment module is embedded in the managing system, as discussed above, the module may store sufficient account information about the user and thus doesn't need to have his or her name or shortened name. Thus, a nickname may be accepted. For instance, the module or the managing system may send transaction center the stored info, whether it is encrypted or not, and the center may find the user's account based on the info. Hence, when a payment module is embedded at an e-commerce site, a user may have options to use a real name or a nickname for online shopping at the site. Use of a nickname doesn't affect a payment process.

Since a merchant may need a user's real name under certain circumstances, like mentioned before, agreements may be made between the merchant and transaction center, which requires transaction center to provide for the merchant a name of a user in given conditions. For instance, the merchant needs the name of a user, when the user sues the merchant in a dispute or the merchant needs to report certain transactions involving the user upon requests from the court or government. On the other hand, users may be required to authorize transaction center to give his or her name to a merchant under given conditions before using a shortened name or a nickname.

In cases where a payment module is not involved, an online merchant may still provide options for a user to use a name or a nickname. For instance, in aforementioned embodiments, the merchant may replace the shortened name option by a nickname option in the interface where a user enters basic user info and let the user choose whether to use a nickname. When the user uses a nickname, a short or long code should be issued. Transaction center may connect a user and a merchant using a short code plus information submitted by the user, such as the user's account info at the center, a shipping address, or other contact info. When a long code is issued, the long code already enables transaction center to find a user. As use of a nickname further protects a user's privacy, it may be desirable for some users.

To make it more flexible and convenient, a merchant may present three options together so that a user has the freedom to use a name, a shortened name, or a nickname. FIG. 20 shows an exemplary interface 98 which illustrates an embodiment for such a scenario. Interface 98 may represent part of a webpage or app page of an e-commerce site displayed on a user device. An online merchant may present windows 95, 97, and 99 as three options. A user may enter a first name and a surname in windows 95, a nickname in window 97, or a shortened name in window 99. It is assumed that transaction center is chosen as a payment method so that the user is eligible to use a nickname or a shortened name.

If the user enters a shortened name in window 99, methods discussed above apply. If the user enters a nickname in window 97, some methods discussed above are suitable to use. For instance, when a managing system of an e-commerce site has an embedded payment module, whether a user uses a shortened name or nickname doesn't affect the purchasing or payment process. All methods involving a payment module remain the same. If a managing system doesn't have a payment module, a nickname may replace a shortened name in cases where a short code or long code is used for finding a user and the shortened name serves as a double check. In these cases, the methods discussed remain the same when the shortened name is replaced by the nickname.

CONCLUSION, RAMIFICATIONS, AND SCOPE

Thus it can be seen that systems and methods are introduced to provide multiple options for in-store and online mobile payments.

The improved method and system have the following features and advantages:

(1). A code is used to represent an in-store merchant (as payee);
(2). A user (as payer) has multiple options to do mobile payment in a store, including the NFC, QR-code, location method, and manual input method;
(3). An in-store merchant has multiple options to implement mobile payment, including the NFC, QR-code, location based, and manual input method;
(4). A user has options to use a first name and a surname, a shortened name, or a nickname for online purchases;
(5). An e-commerce merchant relies on transaction center or an embedded payment module to authenticate a user.

Although the description above contains many specificities, these should not be construed as limiting the scope of the invention but as merely providing illustrations of some of the presently preferred embodiments. Numerous modifications will be obvious to those skilled in the art.

Ramifications:

Using an accelerometer like sensor 22 of FIG. 1, shaking of a device may be used to start a payment app when a user is in a store. For instance, when it is detected that a user device is inside a restaurant, shaking of the device beyond a given period of time may be considered as a command to start a mobile payment app. Thus when a user is ready to foot a bill, he or she may shake a mobile device a bit to start a payment process.

A merchant and a store, as an example of payee, are used to illustrate in-store payment embodiments in most cases. A store may be replaced by other entities, such as a school, an organization, or a government agency, which may have a need to collect money and have registered an account at transaction center.

In a store, a user may speak to a device to enter a code using voice recognition techniques. For instance, a user may say a store code to a device, which may cause a code to appear on a touch-sensitive screen, and then the user may confirm it by saying a word like "correct", "yes" or "Send code", or tap a "Yes" icon on the screen. A verbally-input code may work alone or work with location data of the device, as the codes discussed in other instances.

If an in-store merchant has an active NFC device, it may be designed that a code is created for each transaction without registration at transaction center. Such a code may be distinctive within a certain time period, say within a day. For instance, after a POS system gets a total purchase amount, the system may issue a code specifically for the transaction. The code may be sent to transaction center promptly along with the purchase amount. So the center knows a code is created for a transaction by a merchant. When a user device is held close to the NFC device, the code may be taken by the user device. Then the user device may transmit a message containing the code to transaction center. And transaction center may use the code to find the merchant in the same way or similar way as discussed. The method may reduce potential errors which may occur when transaction center receives messages from two users with the same code within a short period of time. The one-code-per-transaction scheme may also work with QR-code method. At a store for instance, an exclusive QR code may be generated for each transaction by a POS system. Content of a QR code may contain an exclusive code designated to one transaction. After a user device scans a QR code which may be displayed on a screen of the POS system, it may extract the exclusive code and send it to transaction center, along with payer info; meanwhile the POS system may send the code, merchant info, and payment amount to transaction center. Next, transaction center may use the code to relate the user and merchant, and starts a payment processing process.

Availability of multiple codes or multiple code types for one in-store merchant account is arranged by transaction center. Transaction center determines it and designs rules and implementation methods for such practice. Programs and applications may be arranged for implementation of multi-code scenario at the center, store, and user device respectively.

It may be designed that a code arranged for an in-store transaction may be created by bundling a registered store code with a case code which is generated by a merchant system. When a transaction center receives two codes in a message, it may use the store code for identification of a store account, and use the case code as a label for locating a transaction. A case code may be produced by a merchant without the consent of transaction center. Thus without additional work at transaction center, a merchant may create and use a distinctive code to tag each transaction. For instance, when a merchant system handles a transaction and a user device is capable of receiving info from the system, the system may generate a case code after the merchant pushes a button. A store code and case code may be sent together to transaction center and a user device by a merchant system. The message from a store to the center may also contain a payment amount and store info as in other cases. Meanwhile, the user device may send the two codes to transaction center in a user message. At the center, the two codes may be used to connect the two messages, identify the user as the payer and the merchant as the payee, and the payment amount as a due amount.

With an active NFC device at store, the communication between a POS system and a user device may be utilized. For instance, a user device may send an encrypted message to transaction center via a POS system, instead of a wireless network the device has access to. Assume that a POS system has high-speed connection to transaction center, like via land line or cable. Thus, communication via the POS system may be faster, more secure, and more reliable than wireless networks. Once a user device is in contact with a store NFC device, it may get signals which indicate whether a POS system may relay a message. If a POS system has the functionality, a user device may transfer an encrypted message containing a code and user info to the POS system via NFC technology. Next, the POS system may pass the user message to transaction center.

In above discussions, it is assumed that a mobile payment program or application is used at a POS system or a device like a smartphone or a tablet computer at a store. The program or application may be arranged by transaction center or a software company.

If a payment app is installed at a card reader, the card reader may be arranged to communicate with transaction center directly. Then, messages may be sent to the center without going through financial institutions.

When a managing system of an online merchant has a payment module, the module stores some account information relating to transaction center, such as the name of a user and an account number. As the user may not want the merchant to have it, the stored information may be encrypted by transaction center. Alternatively, a payment module may keep an account number of the user, but not the name, since the account number provides sufficient info for the center to find the user. In addition, transaction center may give the user an account code, which represents the user's account and is kept by the payment module. When the module sends transaction center messages related to the user, it includes the account code. Since only transaction center knows what an account code stands for, the code may not need to be encrypted.

After a user submits a shortened name or a nickname at a shopping website, the shortened name or nickname may appear on a webpage when the user logs in his or her account at the website next time, preferably using a password. Thus the user may continue to use a chosen name submitted previously. Additionally, the webpage may provide options such that the user may make a change, like changing from one shortened name to another shortened name, from one nickname to another nickname, from a shortened name or nickname to a regular name which includes a first name and a surname, or from a shortened name to a nickname or vise versa. An "Edit" button may be configured on the webpage. The user may tap the button to open a window where name change may be conducted.

After receiving a user's shortened name, transaction center may compare it against the user's first name and surname in records. It may be configured that transaction center may send the user and a corresponding online merchant messages respectively, if the shortened name doesn't match the first name or the surname. Alternatively, transaction center may reject the shortened name and send the online merchant a rejection message if the discrepancy occurs. When a user has a middle name or the initial of a middle name, the user may be allowed to omit the middle name or not mention it to a merchant. However, if the user's shortened name includes the initial of the middle name, transaction center may check whether it matches the actual one in records.

Lastly, in aforementioned discussions, QR code may be replaced by other machine readable codes without affecting the proposed results, such as one-dimensional bar code, as long as the codes contain info needed and can be read by a user device.

Therefore the scope of the invention should be determined by the appended claims and their legal equivalents, rather than by the examples given.

The invention claimed is:

1. A method performed by a merchant for facilitating online shopping or online purchasing via a computing apparatus, a software, and a communication network, comprising:
   1) sending data to a user's electronic device for an online purchase through the communication network, wherein the electronic device presents a plurality of content items in an interface using the data;
   2) the plurality of content items including a plurality of input areas as options configured in the interface for the user to enter a name of the user including a first name and a surname or enter a shortened name of the user for the purchase;
   3) receiving the name or the shortened name through the communication network after the user enters one of them via the interface; and
   4) sending the name or the shortened name, a purchase amount, and other information to a payment service facility corresponding to a selection made by the user for payment.

2. The method according to claim 1 wherein the shortened name includes a shortened first name plus a surname or a first name plus a shortened surname.

3. The method according to claim 1 wherein the shortened name includes an initial of a middle name.

4. The method according to claim 1 wherein the plurality of content items further include an option for the user to enter a nickname via the interface.

5. The method according to claim 1 wherein the shortened name is applicable when the selection is made by the user for payment.

6. The method according to claim 1 wherein the plurality of content items further include an option for the user to select whether to share predetermined information with the payment service facility.

7. The method according to claim 1, further including running a module of the software after the user makes the selection facility for payment, wherein the module is configured to store information of the user provided by the payment service facility.

8. A method performed by a merchant for facilitating online shopping or online purchasing via a computing apparatus, a software, and a communication network, comprising:
   1) sending data to a user's electronic device for an online purchase via the communication network, wherein the electronic device generates an interface using the data;

2) the interface providing a plurality of options for the user to enter a name of the user including a first name and a surname or enter a shortened name of the user for the purchase;
3) receiving the name or the shortened name via the communication network after the user submits the name or the shortened name through the interface; and
4) sending the name or the shortened name and information related to the purchase to a payment service facility corresponding to a selection made by the user for payment.

9. The method according to claim 8 wherein the shortened name includes a shortened first name plus a surname or a first name plus a shortened surname.

10. The method according to claim 8 wherein the shortened name includes an initial of a middle name.

11. The method according to claim 8 wherein the interface further provides an option for the user to enter a nickname via the interface.

12. The method according to claim 8 wherein the shortened name is applicable when the user makes the selection for payment.

13. The method according to claim 8 wherein the interface further provides an option for the user to select whether to share predetermined information with the payment service facility.

14. The method according to claim 8, further including running a module of the software after the user makes the selection for payment, wherein the module is configured to store information of the user provided by the payment service facility.

15. A method performed by a merchant for facilitating online shopping or online purchasing via a computing apparatus, a software, and a communication network, comprising:
1) sending data to a user's electronic device for an online purchase via the communication network, wherein the electronic device generates an interface using the data;
2) the interface providing an option for the user to submit a shortened name of the user for the purchase;
3) receiving the shortened name via the communication network after the user provides the shortened name; and
4) sending the shortened name and information related to the purchase to a payment service facility corresponding to a selection made by the user for payment.

16. The method according to claim 15 wherein the shortened name includes a shortened first name plus a surname or a first name plus a shortened surname.

17. The method according to claim 15 wherein the shortened name includes an initial of a middle name.

18. The method according to claim 15, further including providing an option for the user to use a nickname or replace the shortened name by a nickname.

19. The method according to claim 15, further including providing an option for the user to select whether to share predetermined information with the predetermined payment service facility.

20. The method according to claim 15, further including running a module of the software after the user makes the selection for payment, wherein the module is configured to store information of the user provided by the payment service facility.

* * * * *